(12) United States Patent
Ozeki et al.

(10) Patent No.: US 11,714,323 B2
(45) Date of Patent: Aug. 1, 2023

(54) DISPLAY DEVICE

(71) Applicant: Japan Display Inc., Tokyo (JP)

(72) Inventors: Yoshitaka Ozeki, Tokyo (JP); Koshiro Moriguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/730,326

(22) Filed: Apr. 27, 2022

(65) Prior Publication Data

US 2022/0350212 A1    Nov. 3, 2022

(30) Foreign Application Priority Data

Apr. 28, 2021   (JP) ................................ 2021-076822

(51) Int. Cl.
  *G02F 1/1362*  (2006.01)
  *G02F 1/1368*  (2006.01)
(52) U.S. Cl.
  CPC ...... *G02F 1/136286* (2013.01); *G02F 1/1368* (2013.01)
(58) Field of Classification Search
  CPC .................................................. G02F 1/1303
  See application file for complete search history.

(56) References Cited

U.S. PATENT DOCUMENTS

| 2011/0058116 A1 | 3/2011 | Yamazaki et al. |
| 2017/0337864 A1* | 11/2017 | Igeta ................. G02F 1/136286 |
| 2021/0027718 A1* | 1/2021 | Yokoyama ............... G09F 9/30 |
| 2021/0356830 A1* | 11/2021 | Yoshida ............ G02F 1/136286 |

FOREIGN PATENT DOCUMENTS

| JP | 2014-146819 A | 8/2014 |
| JP | 2015-159315 A | 9/2015 |

* cited by examiner

*Primary Examiner* — Sang V Nguyen
(74) *Attorney, Agent, or Firm* — K&L Gates LLP

(57) ABSTRACT

A display device includes a display area, a frame area surrounding the display area, a plurality of pixel circuit in the display area, a peripheral circuit in the frame area, and wirings connecting the pixel circuit and the peripheral circuit, wherein the peripheral circuit incudes a plurality of switch circuits along a direction away from the display area, a plurality of relay electrodes between the display area and the plurality of switch circuits, and a plurality of connecting wirings connecting each of the plurality of relay electrodes and each of the plurality of switch circuits, and the plurality of relay electrodes is connected to the wirings, and one of the plurality of connecting wirings connecting one of the plurality of switch circuits and one of the plurality of relay electrodes intersects at least one of the other plurality of switch circuits in a plan view.

9 Claims, 16 Drawing Sheets

DISPLAY DEVICE

CROSS REFERENCE TO RELATED APPLICATIONS

This application claims the benefit of priority to Japanese Patent Application No. 2021-076822, filed on Apr. 28, 2021, the entire contents of which are incorporated herein by reference.

FIELD

An embodiment of the present invention relates to a display device. In particular, an embodiment of the present invention relates to a display device using a transistor containing an oxide semiconductor.

BACKGROUND

Recently, in place of amorphous silicon, low-temperature polysilicon, and single-crystal silicon, a transistor using an oxide semiconductor for a channel has been developed (e.g., Japanese laid-open patent publication No. 2014-146819 and Japanese laid-open patent publication No. 2015-159315). A transistor using an oxide semiconductor for a channel is formed in a simple-structured, low-temperature process, similar to a transistor using amorphous silicon for the channel. It is known that the transistor using an oxide semiconductor for the channel has higher mobility and a much lower off current than the transistor using amorphous silicon for the channel.

SUMMARY

A display device according to an embodiment of the present invention includes a display area, a frame area surrounding the display area, a plurality of pixel circuit in the display area, a peripheral circuit in the frame area, and wirings connecting the pixel circuit and the peripheral circuit, wherein the peripheral circuit incudes a plurality of switch circuits along a direction away from the display area, a plurality of relay electrodes between the display area and the plurality of switch circuits, and a plurality of connecting wirings connecting each of the plurality of relay electrodes and each of the plurality of switch circuits, and the plurality of relay electrodes is connected to the wirings, and one of the plurality of connecting wirings connecting one of the plurality of switch circuits and one of the plurality of relay electrodes intersects at least one of the other plurality of switch circuits in a plan view.

DESCRIPTION OF EMBODIMENTS

Figure 1:
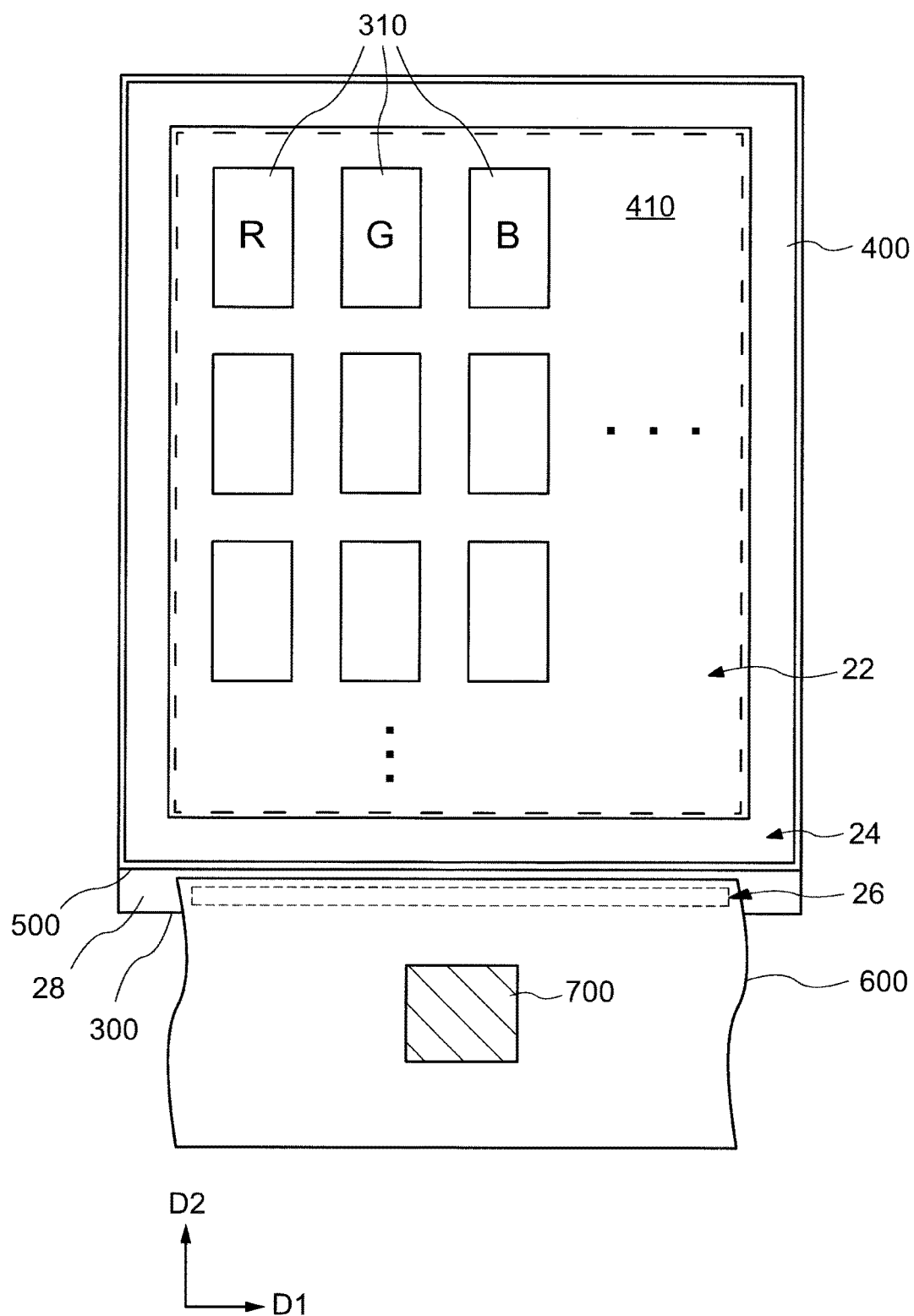
FIG. 1 is a plan view showing an outline of a display device according to an embodiment of the present invention.

In a display device such as head-mounted displays, high-definition displays with an increased number of pixels are desired. When the number of pixels increases (higher definition), the number of wirings of peripheral circuits and terminal parts for driving the pixels increases in a frame area. Therefore, in the frame area, an area occupied by wirings increases, and it becomes difficult to narrow the frame.

In view of the above problems, it is an object of an embodiment of the present invention to provide a narrower frame in a high-definition display device.

Embodiments of the present invention will be described below with reference to the drawings. The following disclosure is merely an example. A configuration that can be easily conceived by a person skilled in the art by appropriately changing the configuration of the embodiment while maintaining the gist of the invention is included in the scope of the present invention. For the sake of clarity of description, the drawings may be schematically represented with respect to widths, thicknesses, shapes, and the like of the respective portions in comparison with actual embodiments. However, the illustrated shapes are merely examples and are not intended to limit the interpretation of the present invention. In this specification and each of the drawings, the same symbols are assigned to the same components as those described above with reference to the preceding drawings, and a detailed description thereof may be omitted as appropriate.

In the embodiments of the present invention, a direction from a substrate toward an oxide semiconductor layer is referred to as above or upper. On the other hand, a direction from an oxide semiconductor layer toward a substrate is referred to as below or lower. As described above, although the phrase "above" or "below" is used for convenience of explanation, for example, the vertical relationship between the substrate and the oxide semiconductor layers may be arranged in a direction different from that shown in the drawing. In the following description, for example, an expression "oxide semiconductor layer on a substrate" merely describes the vertical relationship between the substrate and the oxide semiconductor layer as described above, and other members may be arranged between the substrate and the oxide semiconductor layer. Above or below refers to whether a member is positioned on the upper side or on the lower side in a configuration in which a plurality of layers is stacked, and it does not require that the layers overlap each other when viewed in a plane.

"Display device" refers to a structure that displays an image using an electro-optic layer. For example, the term display device may refer to a display panel that includes an electro-optic layer, or it may refer to a structure in which other optical members (e.g., polarized member, backlight, touch panel, etc.) are attached to a display cell. An "electro-optic layer" can include a liquid crystal layer, an electroluminescence (EL) layer, an electrochromic (EC) layer, and an electrophoretic layer, as long as there is no technical contradiction. Therefore, although the embodiment described later will be described by exemplifying a liquid crystal display device including a liquid crystal layer as a display device, the structure in the present embodiment can also be applied to a display device including the other electro-optical layers described above.

The expressions "α includes A, B, or C", "a includes any of A, B, and C", and "α includes one selected from a group consisting of A, B, and C" do not exclude the case where α includes a plurality of combinations of A to C unless otherwise specified. Furthermore, these expressions do not exclude the case where α includes other elements.

The following embodiments may be combined with each other as long as there is no technical contradiction.

First Embodiment

[1. Outline of Display Device 10]

Figure 2:
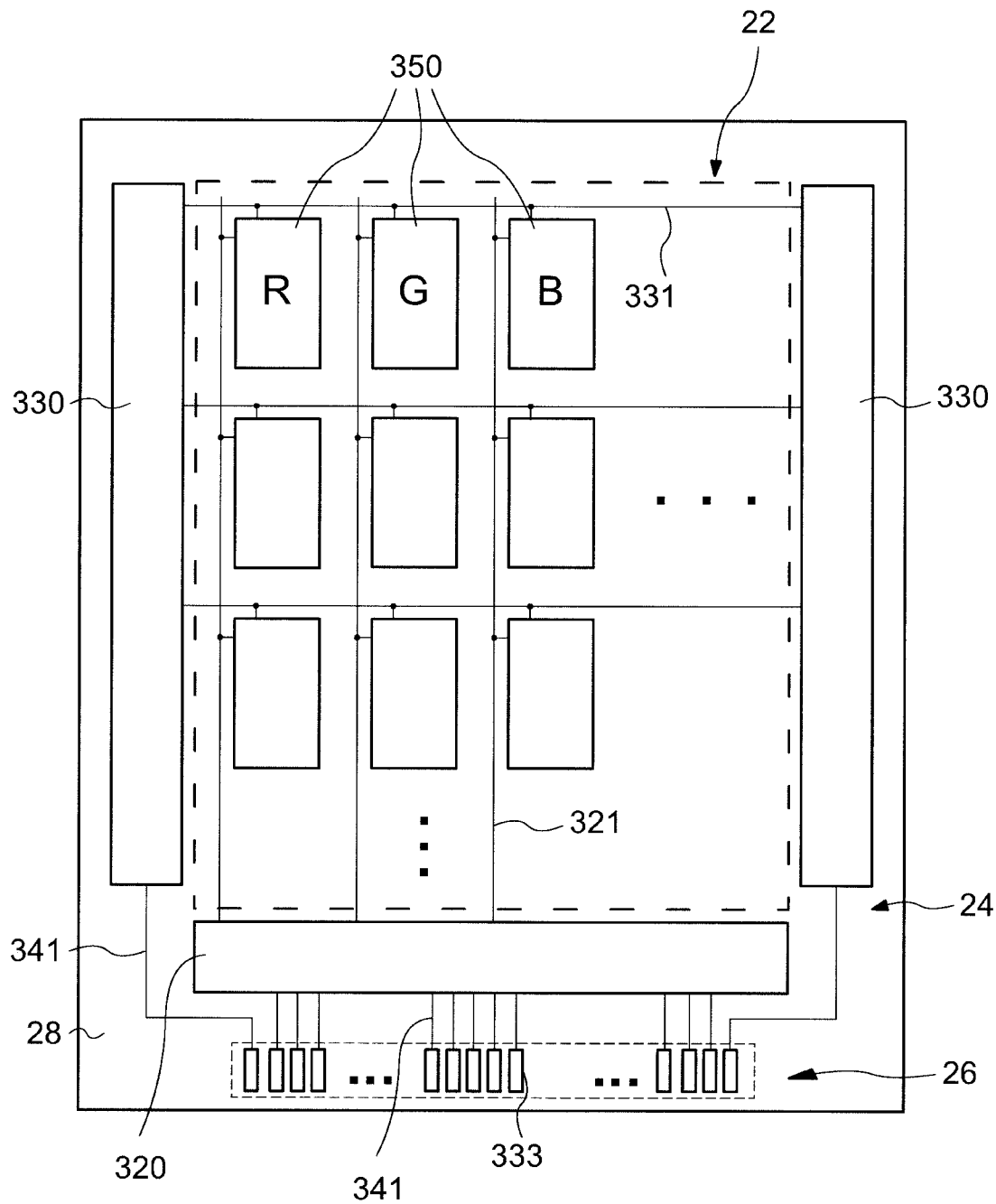
FIG. 2 is a block diagram showing a circuit configuration of a display device according to an embodiment of the present invention.
Figure 3:
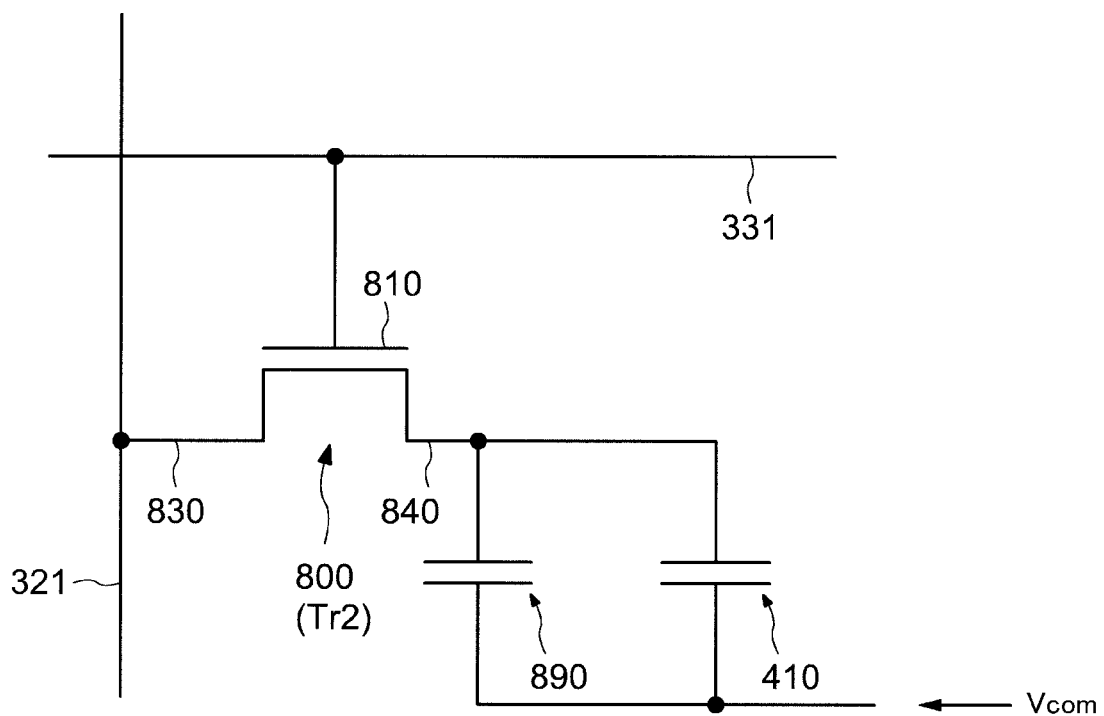
FIG. 3 is a diagram of a circuit of a pixel circuit of a pixel of a display device according to an embodiment of the present invention.

Referring to FIG. 1 to FIG. 3, an outline of a display device 10 according to an embodiment of the present invention will be described. FIG. 1 is a plan view showing an outline of the display device 10 according to an embodiment of the present invention. As shown in FIG. 1, the display device 10 includes an array substrate 300, a seal 400, a counter substrate 500, a flexible printed circuit board 600 (FPC 600), and an IC chip 700. The array substrate 300 and the counter substrate 500 are bonded by the seal 400. A display area 22 surrounded by the seal 400, a liquid crystal is filled, and a plurality of pixels 310 is arranged in a matrix along a first direction D1 (row direction) and a second direction D2 intersecting the first direction D1 (column direction). The plurality of pixels 310 includes a red pixel R, a green pixel G, and a blue pixel B. The first direction D1 may be orthogonal to the second direction D2. The display area 22 is an area overlapping a liquid crystal element 410 to be described later in a plan view.

A seal area 24 is located in a frame area 28 surrounding the display area 22 and a seal 400 is provided. The FPC 600 is connected to a terminal area 26. The terminal area 26 is located in an area of the frame area 28 where the array substrate of 300 is exposed from the counter substrate 500 and outside the seal area 24. The outside of the seal area 24 means the outside of the area in the frame area 28 and surrounded by the seal 400. The IC chip 700 is provided on the FPC 600. The IC chip 700 outputs a signal for driving a pixel circuit 350 of each pixel 310 (see FIG. 2).

[2. Circuit Configuration of Display Device 10]

FIG. 2 is a block diagram showing a circuit configuration of the display device 10 according to an embodiment of the present invention. As shown in FIG. 2, a gate driver circuit 330 is provided at a position adjacent to the first direction D1 in the display area 22 in which the pixel circuit 350 of the pixel 310 is arranged, and a source driver circuit 320 is provided at a position adjacent to the second direction D2 in the display area 22. The gate driver circuit 330 and the source driver circuit 320 are provided in the frame area 28 described above.

A gate wiring 331 extends from the gate driver circuit 330 in the first direction D1 and is connected to the pixel circuit 350 of the plurality of pixels 310 arranged in the first direction D1. A source wiring 321 extends from the source driver circuit 320 in the second direction D2 and is connected to the pixel circuit 350 of the plurality of pixels 310 arranged in the second direction D2.

The terminal area 26 is provided with a plurality of terminal parts 333. A structure of the terminal part 333 will be described in detail later. Each of the plurality of terminal parts 333 and the source driver circuit 320 are connected by a connecting wiring 341. Similarly, the terminal part 333 and the gate driver circuit 330 are connected by the connecting wiring 341. The source driver circuit 320 and the gate driver circuit 330 are connected to the IC chip 700 by the FPC 600 connected to the terminal 333. The IC chip controls the source driver circuit 320 and the gate driver circuit 330 based on an input signal from an external device.

Consequently, the pixel circuit 350 included in each pixel 310 in the display area 22 is driven.

[3. Pixel Circuit 350 of Pixel 310 of Display Device 10]

FIG. 3 is a diagram of a circuit of the pixel circuit 350 of the pixel 310 of the display device 10 according to an embodiment of the present invention. As shown in FIG. 3, the pixel circuit 350 includes elements such as a pixel transistor (pixel switch) 800, a storage capacitor 890, and a liquid crystal element 410. As will be described in detail later, one electrode of the storage capacitor 890 is a pixel electrode PTCO2 and the other electrode includes a common electrode CTCO2. Similarly, one electrode of the liquid crystal element 410 is the pixel electrode PTCO2 and the other electrode is the common electrode CTCO2. A common potential VCOM is supplied to the common electrode CTCO2. The pixel transistor 800 has a gate electrode 810, a source electrode 830, and a drain electrode 840. The gate electrode 810 is connected to the gate wiring 331. The source electrode 830 is connected to the source wiring 321. The drain electrode 840 is connected to the storage capacitor 890 and the liquid crystal element 410. In the present embodiment, for convenience of explanation, 830 is referred to as the source electrode, 840 is referred to as the drain electrode, and the function as a source and a drain of each electrode may be interchanged.

[4. Configuration of Display Device 10]

Figure 4:
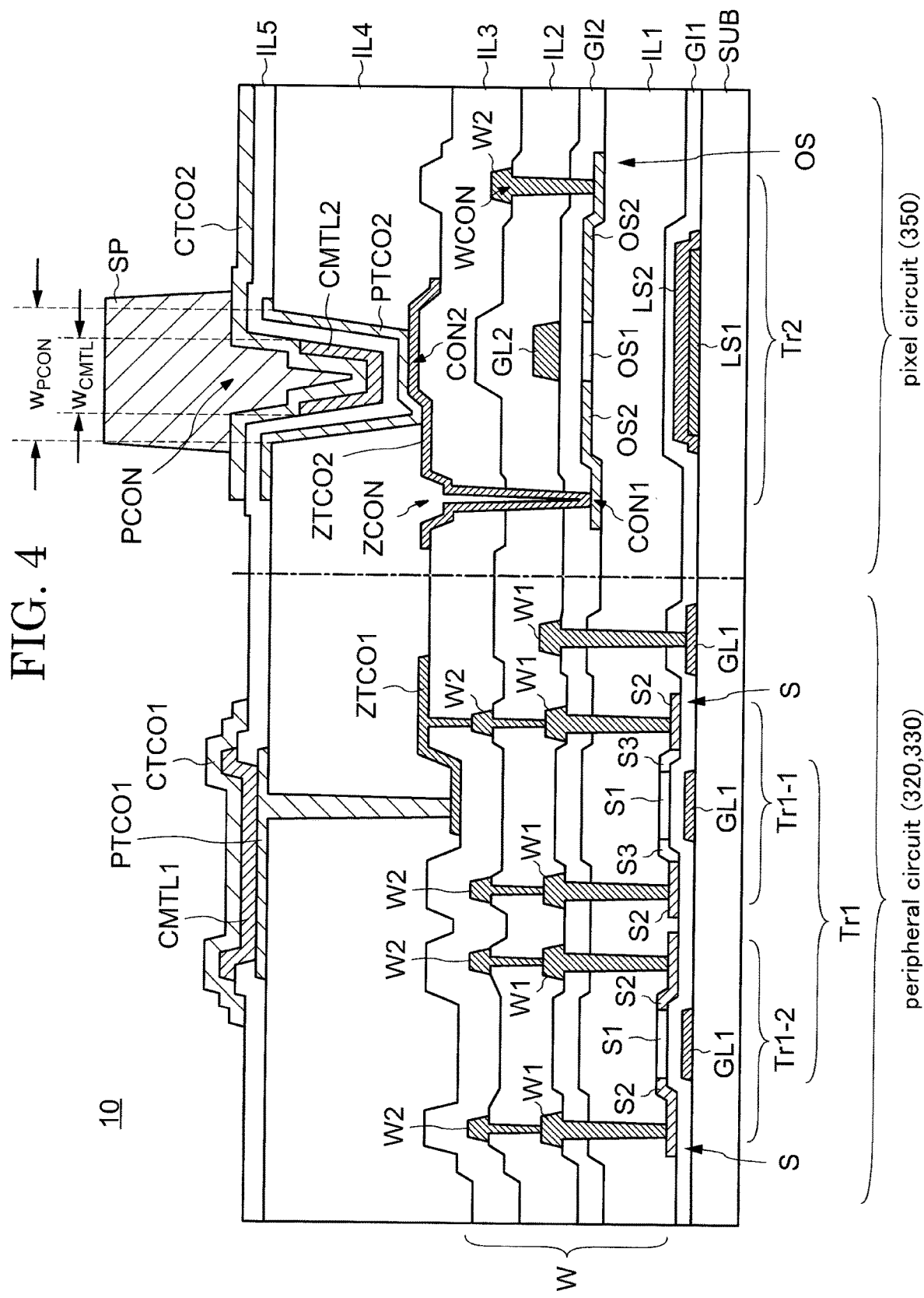
FIG. 4 is a cross-sectional view showing a configuration of a display device according to an embodiment of the present invention.
Figure 5:
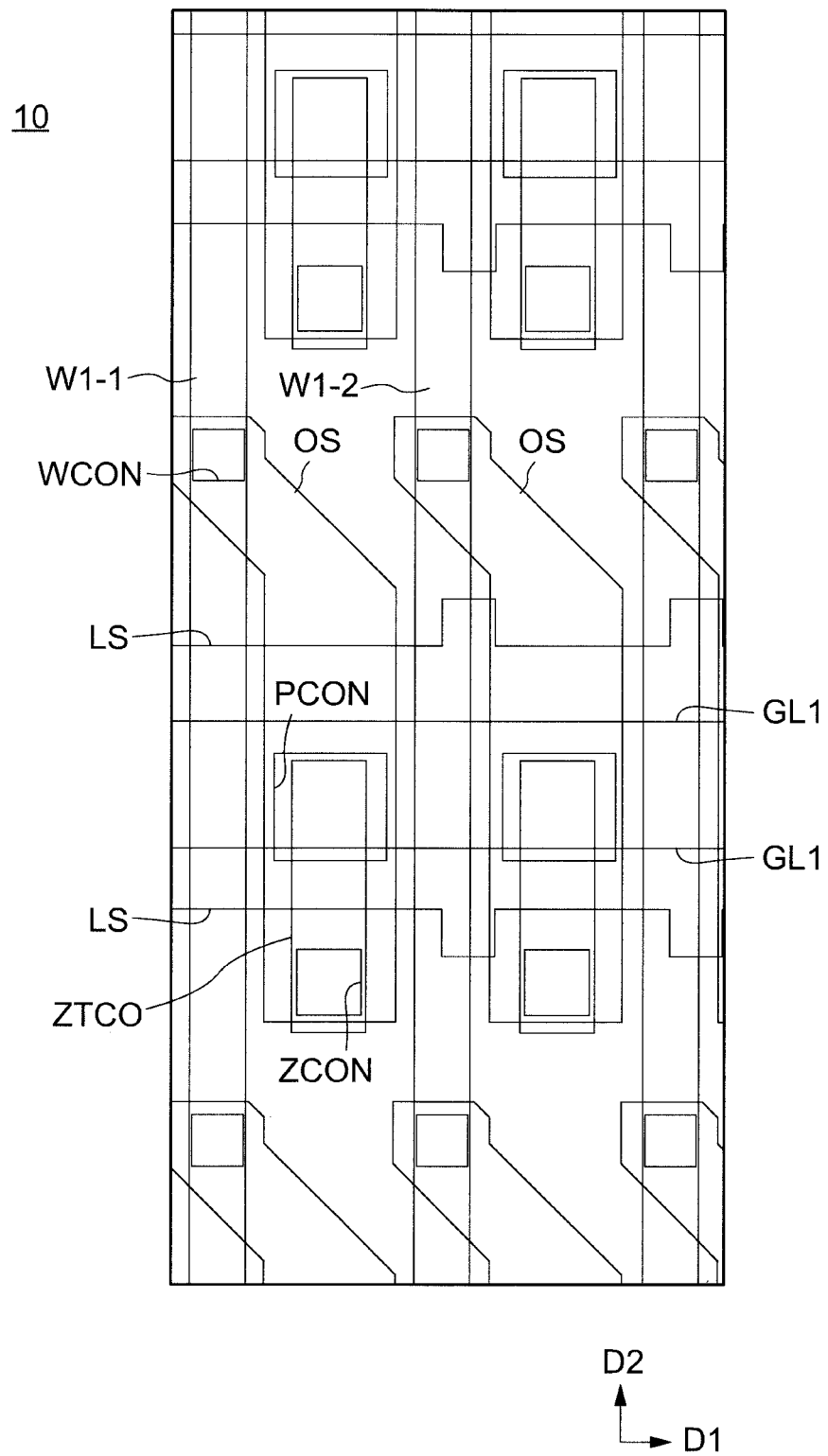
FIG. 5 is a layout of a pixel of a display device according to an embodiment of the present invention.

A detailed configuration of the display device 10 according to an embodiment of the present invention will be described with reference to FIG. 4 and FIG. 5. FIG. 4 is a cross-sectional view showing a configuration of the display device 10 according to an embodiment of the present invention. FIG. 5 is a layout of a pixel of the display device 10 according to an embodiment of the present invention. The cross-sectional view in FIG. 4 is an exemplary cross-sectional view for briefly illustrating the layered structure of the display device 10, as a typical example, and a peripheral circuit and the pixel circuit 350 are shown in an adjacent configuration. In practice, the pixel circuit 350 is provided in the display area 22, the peripheral circuit is provided in the frame area 28 outside the display area 22, and it is needless to say that the pixel circuit 350 and the peripheral circuit are provided spaced apart. In particular, the pixel circuit 350 in FIG. 4 is shown centered on a contact hole peripheral part in the pixel area, and only a portion of a transmission area (opening area) which contributes to the display is shown. In FIG. 4, what is shown as a peripheral circuit is a typical example around the transistor provided in the source driver circuit 320 and the gate driver circuit 330, and what is shown as the pixel circuit 350 is a typical example around the pixel transistor in the pixel circuit 350.

As shown in FIG. 4, the display device 10 has a substrate SUB. The display device 10 has a transistor Tr1, a transistor Tr2, wirings W1, W2, connection electrodes ZTCO1, ZTCO2, a transparent conductive layer PTCO1, the pixel electrode PTCO2, common auxiliary electrodes CMTL1, CMTL2, a transparent conductive layer CTCO1, and the common electrode CTCO2 above the substrate SUB. TCO is an abbreviation for Transparent Conductive Oxide. The transistor Tr1 is a transistor included in the peripheral circuit such as the source driver circuit 320 or the gate driver circuit 330. The transistor Tr2 is a transistor included in the pixel circuit 350 of the pixel 310 of the display device 10.

[5. Configuration of Peripheral Circuit]

The peripheral circuit includes at least the transistor Tr1 which includes an n-type transistor Tr1-1 and an p-type transistor Tr1-2.

The n-type transistor Tr1-1 and the p-type transistor Tr1-2 both have a gate wiring GL1, a gate insulating layer GI1, and a semiconductor layer S. The gate wiring GL1 faces the semiconductor layer S. The gate insulating layer GI1 is provided between the semiconductor layer S and the gate wiring GL1. In the present embodiment, although a bottom-gate transistor in which the gate wiring GL1 is provided closer to the substrate SUB side than the semiconductor layer S is exemplified, a top-gate transistor in which the positional relationship between the semiconductor layer S and the gate wiring GL1 is reversed may also be used.

The semiconductor layer S of the p-type transistor Tr1-2 includes semiconductor layers S1, S2. The semiconductor layer S of the n-type transistor Tr1-1 includes the semiconductor layers S1, S2, S3. The semiconductor layer S1 is a semiconductor layer in an area overlapping the gate wiring GL1 in a plan view. The semiconductor layer S1 functions as a channel for the n-type transistor Tr1-1. The semiconductor layer S2 functions as a conductive layer. The semiconductor layer S3 functions as a conductive layer having higher resistance than the semiconductor layer S2. In the gate wiring GL1, an area overlapping the semiconductor layer S may be referred to as a gate electrode. The semiconductor layer S3 suppresses hot carrier degradation by attenuating hot carriers intruding toward the semiconductor layer S1.

An insulating layer IL1 and a gate insulating layer GI2 are provided above the semiconductor layer S. The gate insulating layer GI2 simply functions as an interlayer film in the transistor Tr1. The wiring W1 is provided above these insulating layers. Wiring W1 is connected to the semiconductor layer S via an opening provided in the insulating layer IL1 and the gate insulating layer GI2. An insulating layer IL2 is provided above the wiring W1. Wiring W2 is provided above the insulating layer IL2. The wiring W2 is connected to the wiring W1 via an opening provided in the insulating layer IL2.

The gate wiring GL1 and a light-shielding layer LS2 are the same layer. The wiring W1 and a gate wiring GL2 are the same layer. Hereinafter, the same layer means that a plurality of members is formed by patterning one layer.

The insulating layer IL2 is provided on the wiring W1. The wiring W2 is provided above the insulating layer IL2. The wiring W2 is connected to the wiring W1 via a contact hole provided in the insulating layer IL2. An insulating layer IL3 is provided on the insulating layer IL2 and the wiring W2. The connection electrode ZTCO1 is provided on the insulating layer IL3. The connection electrode ZTCO1 is connected to the wiring W2 via a contact hole provided in the insulating layer IL3. The connection electrode ZTCO1 is a transparent conductive layer. An insulating layer IL4 is provided on the insulating layer IL3 and the connection electrode ZTCO1. The insulating layer IL4 relieves a step formed by the structure provided below the insulating layer IL4. The transparent conductive layer PTCO1 is provided on the insulating layer IL4. The transparent conductive layer PTCO1 is connected to the connection electrode ZTCO1 via a contact hole provided in the insulating layer IL4. An insulating layer IL5 is provided on the insulating layer IL4 and the transparent conductive layer PTCO1. The common auxiliary electrode CMTL1 is provided on the insulating layer IL5. The common auxiliary electrode CMTL1 is connected to the transparent conductive layer PTCO1 via a contact hole provided in the insulating layer IL5. The transparent conductive layer CTCO1 is provided on the common auxiliary electrode CMTL1. The wiring W1 is connected to the transparent conductive layer CTCO1 via the wiring W2, the connection electrode ZTCO1, the transparent conductive layer PTCO1, and the common auxiliary electrode CMTL1. The connection electrode ZTCO1, the transparent conductive layer PTCO1, the common auxiliary electrode CMTL1, and the transparent conductive layer CTCO1 will be described in detail in FIG. 7 and later.

[6. Configuration of Pixel Circuit 350]

Next, a configuration of the pixel circuit 350 will be described with reference to FIG. 4 and FIG. 5. The transistor Tr2 includes an oxide semiconductor layer OS, the gate insulating layer GI2, and the gate wiring GL2. The gate wiring GL2 faces the oxide semiconductor layer OS. The gate insulating layer GI2 is provided between the oxide semiconductor layer OS and the gate wiring GL2. In the present embodiment, although the top-gate transistor in which the oxide semiconductor layer OS is provided closer to the substrate SUB side than the gate wiring GL2 is exemplified, the bottom-gate transistor in which the positional relationship between the gate wiring GL2 and the oxide semiconductor layer OS is reversed may also be used. In FIG. 5, the layout of the insulating layer IL5, the common auxiliary electrode CMTL2, and the common electrode CTCO2 is not shown.

The oxide semiconductor layer OS includes oxide semiconductor layers OS1, OS2. The oxide semiconductor layered OS1 is an area overlapping the gate wiring GL2 in a plan view. The oxide semiconductor layer OS1 functions as a semiconductor layer and is switched between a conducting state and a non-conducting state according to a voltage supplied to the gate wiring GL2. That is, the oxide semiconductor layer OS1 functions as a channel for the transistor Tr2. The oxide semiconductor layer OS2 functions as a conductive layer. The oxide semiconductor layers OS1, OS2 are formed from the same oxide semiconductor layer. For example, the oxide semiconductor layer OS2 is an area whose resistance is reduced by doping an impurity into a layer having the same physical property as the oxide semiconductor layer OS1.

The insulating layer IL2 is provided above the gate wiring GL2. The wiring W2 is provided above the insulating layer IL2. The wiring W2 is connected to the oxide semiconductor layer OS2 via an opening WCON provided in the insulating layer IL2 and the gate insulating layer GI2. A data signal related to the gradation of the pixel is transmitted to the wiring W2. The wiring W2 functions as either a source electrode or a drain electrode. The insulating layer IL3 is provided above the insulating layer IL2 and the wiring W2. The connection electrode ZTCO2 is provided above the insulating layer IL3. The connection electrode ZTCO2 is connected to the oxide semiconductor layer OS2 via an opening ZCON provided in the insulating layers IL3, IL2, and the gate insulating layer GI2. The connection electrode ZTCO2 functions as either a source electrode or a drain electrode. The connection electrode ZTCO2 is in contact with the oxide semiconductor layer OS2 at the bottom of the opening ZCON. The connection electrode ZTCO2 is a transparent conductive layer.

In this case, for example, when a transparent conductive layer such as an ITO layer is formed so as to be in contact with a semiconductor layer such as a silicon layer, the surface of the semiconductor layer is oxidized by the process gas or oxygen ions at the time of deposition of an ITO film. Since the oxide layer formed on the surface of the semiconductor layer has high resistance, the contact resistance between the semiconductor layer and the transparent conductive layer becomes high. As a result, a defect occurs in the electrical contact between the semiconductor layer and the transparent conductive layer. On the other hand, even if the above transparent conductive layer is formed so as to be in contact with the oxide semiconductor layer, a high resistance oxide layer as described above is not formed on the surface of the oxide semiconductor layer. Therefore, there is no defect in the electrical contact between the oxide semiconductor layer and the transparent conductive layer.

The insulating layer IL4 is provided above the connection electrode ZTCO2. The insulating layer IL4 may be referred to as a planarization film. The pixel electrode PTCO2 is provided above the insulating layer IL4. The pixel electrode PTCO2 is connected to the connection electrode ZTCO2 via an opening PCON provided in the insulating layer IL4. The pixel electrode PTCO2 is a transparent conductive layer.

The insulating layer IL5 is provided above the pixel electrode PTCO2. The common auxiliary electrode CMTL2 and the common electrode CTCO2 are provided above the insulating layer IL5. As will be described in detail later, the common auxiliary electrode CMTL2 and the common electrode CTCO2 have different plan patterns. The common auxiliary electrode CMTL2 is a metal layer. The common electrode CTCO2 is a transparent conductive layer. The electrical resistance of the common auxiliary electrode CMTL2 is lower than the electrical resistance of the common electrode CTCO2. The common auxiliary electrode CMTL2 also functions as a light-shielding layer, for example, by shielding light from adjacent pixels, it is possible to suppress the occurrence of color mixing. A spacer SP is provided above the common electrode CTCO2.

The spacer SP is provided for a number of pixels. For example, the spacer SP may be provided for any one pixel of the red pixel, the green pixel, and the blue pixel. However, the spacer SP may also be provided for all the pixels. The height of the spacer SP is half the height of the cell gap. The spacer is also provided on counter substrate, and the spacer on the counter substrate, and the above-described spacer SP overlap in a plan view.

The spacer SP can adopt not only this type of structure but also a structure in which the spacer SP has a height corresponding to the cell gap, and a structure in which a second contact area CON2 is simply filled can also be adopted.

The light-shielding layer LS is provided between the transistor Tr2 and the substrate SUB. In the present embodiment, light-shielding layers LS1, LS2 are provided as the light-shielding layer LS. However, the light-shielding layer LS may be formed of only the light-shielding layer LS1 or only the light-shielding layer LS2. In a plan view, the light-shielding layer LS is provided in an area where the gate wiring GL2 and the oxide semiconductor layer OS overlap. That is, in a plan view, the light-shielding layer LS is provided in an area overlapping the oxide semiconductor layer OS1. The light-shielding layer LS suppresses the light incident from the substrate SUB side from reaching the oxide semiconductor layer OS1. In the case where a conductive layer is used as the light-shielding layer LS, the oxide semiconductor layer OS1 can be controlled by applying a voltage to the light-shielding layer LS. In the case where a voltage is applied to the light-shielding layer LS, the light-shielding layer LS and the gate wiring GL2 may be connected by the frame area 28. In a plan view, the first contact area CON1 described above is provided in an area which does not overlap the light-shielding layer LS.

[7. Material of Each Member of Display Device 10]

A rigid substrate having light transmittance and no flexibility, such as a glass substrate, a quartz substrate, or a sapphire substrate, can be used as the substrate SUB. On the other hand, in the case where the substrate SUB needs to have flexibility, a substrate having flexibility and containing a resin such as a polyimide substrate, an acrylic substrate, a siloxane substrate, or a fluororesin substrate can be used as the substrate SUB. Impurities may be introduced into the above resin to improve the heat resistance of the substrate SUB.

A metal material can be used as the gate wirings GL1, GL2, the wirings W1, W2, the light-shielding layer LS, and the common auxiliary electrodes CMTL1, CMTL2. For example, aluminum (Al), titanium (Ti), chromium (Cr), cobalt (Co), nickel (Ni), molybdenum (Mo), hafnium (Hf), tantalum (Ta), tungsten (W), bismuth (Bi), or silver (Ag), or an alloy or compound thereof is used as the metal material. The metal materials may be used in a single layer or a stacked layer as the member. For example, a stacked structure of Ti/Al/Ti is used as the gate wiring GL2. In the present embodiment, the cross-sectional shape of the pattern end of the gate wiring GL2 of the stacked structure is a forward tapered shape.

Common insulating materials can be used as the gate insulating layers GI1, GI2 and the insulating layers IL1 to IL5. For example, an inorganic insulating layer such as silicon oxide ($SiO_x$), silicon oxynitride ($SiO_xN_y$), silicon nitride ($SiN_x$), silicon nitride oxide ($SiN_xO_y$), aluminum oxide ($AlO_x$), aluminum oxynitride ($AlO_xN_y$), aluminum nitride oxide ($AlN_xO_y$), or aluminum nitride ($AlN_x$) can be used as the insulating layers IL1 to IL3, IL5. A low defect insulating layer can be used as these insulating layers. Organic insulating materials such as a polyimide resin, an acrylic resin, an epoxy resin, a silicone resin, a fluororesin, or a siloxane resin can be used as the insulating layer IL4. The above organic insulating materials may be used as the gate insulating layers GI1, GI2, and the insulating layers IL1 to IL3, IL5. The above materials may be used in a single layer or a stacked layer as the above member.

$SiO_x$ with a thickness of 100 nm is used as the gate insulating layer GI1 as an example of the above insulating layer. $SiO_x/SiN_x/SiO_x$ with a total thickness of 600 nm to 700 nm is used as the insulating layer IL1. $SiO_x/SiN_x$ with a total thickness of 60 nm to 100 nm is used as the gate insulating layer GI2. $SiO_x/SiN_x/SiO_x$ with a total thickness of 300 nm to 500 nm is used as the insulating layer IL2. $SiO_x$ (single layer), $SiN_x$ (single layer) with a total thickness of 200 nm to 500 nm, or a stacked layer thereof is used as the insulating layer IL3. An organic layer with a thickness of 2 μm to 4 μm is used as the insulating layer IL4. $SiN_x$ (single layer) with a thickness of 50 nm to 150 nm is used as the insulating layer IL5.

The above $SiO_xN_y$ and $AlO_xN_y$ are silicone and aluminum compounds containing nitrogen (N) in a ratio (x>y) less than that of oxygen (O). $SiN_xO_y$ and $AlN_xO_y$ are silicone and aluminum compounds containing oxygen in a ratio (x>y) less than that of nitrogen.

An oxide semiconductor layer with semiconductor characteristics can be used as the oxide semiconductor layer OS. The oxide semiconductor layer OS has light transmittance. For example, an oxide semiconductor containing indium (In), gallium (Ga), zinc (Zn), and oxygen (O) can be used. In particular, an oxide semiconductor having a compositional ratio of In:Ga:Zn:O=1:1:1:4 can be used. However, the oxide semiconductor containing In, Ga, Zn, and O used in the present embodiment is not limited to the above composition, and an oxide semiconductor having a composition different from that described above can also be used. For example, the ratio of In may be made larger than that described above to improve mobility. The ratio of Ga may be made larger to increase the bandgap and reduce the influence of light irradiation.

Other elements may be added to the oxide semiconductor containing In, Ga, Zn, and O. For example, a metal element such as Al or Sn may be added to the oxide semiconductor. In addition to the oxide semiconductor described above, an oxide semiconductor containing In and Ga (IGO), an oxide semiconductor containing In and Zn (IZO), and an oxide semiconductor containing In, Sn, and Zn (ITZO), or an oxide semiconductor containing In and W may be used as the oxide semiconductor layers OS. The oxide semiconductor layer OS may be amorphous or crystalline. The oxide semiconductor layer OS may be a mixed phase of amorphous and crystalline.

A transparent conductive material is used as the connection electrodes ZTCO1, ZTCO2, the transparent conductive layer PTCO1, the pixel electrode PTCO2, the transparent conductive layer CTCO1, and the common electrode CTCO2. The transparent conductive layer PTCO1 and the pixel electrode PTCO2 are formed from the same film. The transparent conductive layer CTCO1 and the common electrode CTCO2 are formed from the same film. A mixture of indium oxide and tin oxide (ITO) or a mixture of indium oxide and zinc oxide (IZO) or the like can be used as the transparent conductive material. A material other than the above may be used as the transparent conductive material.

[8. Configuration of Peripheral Circuit]

Figure 6:
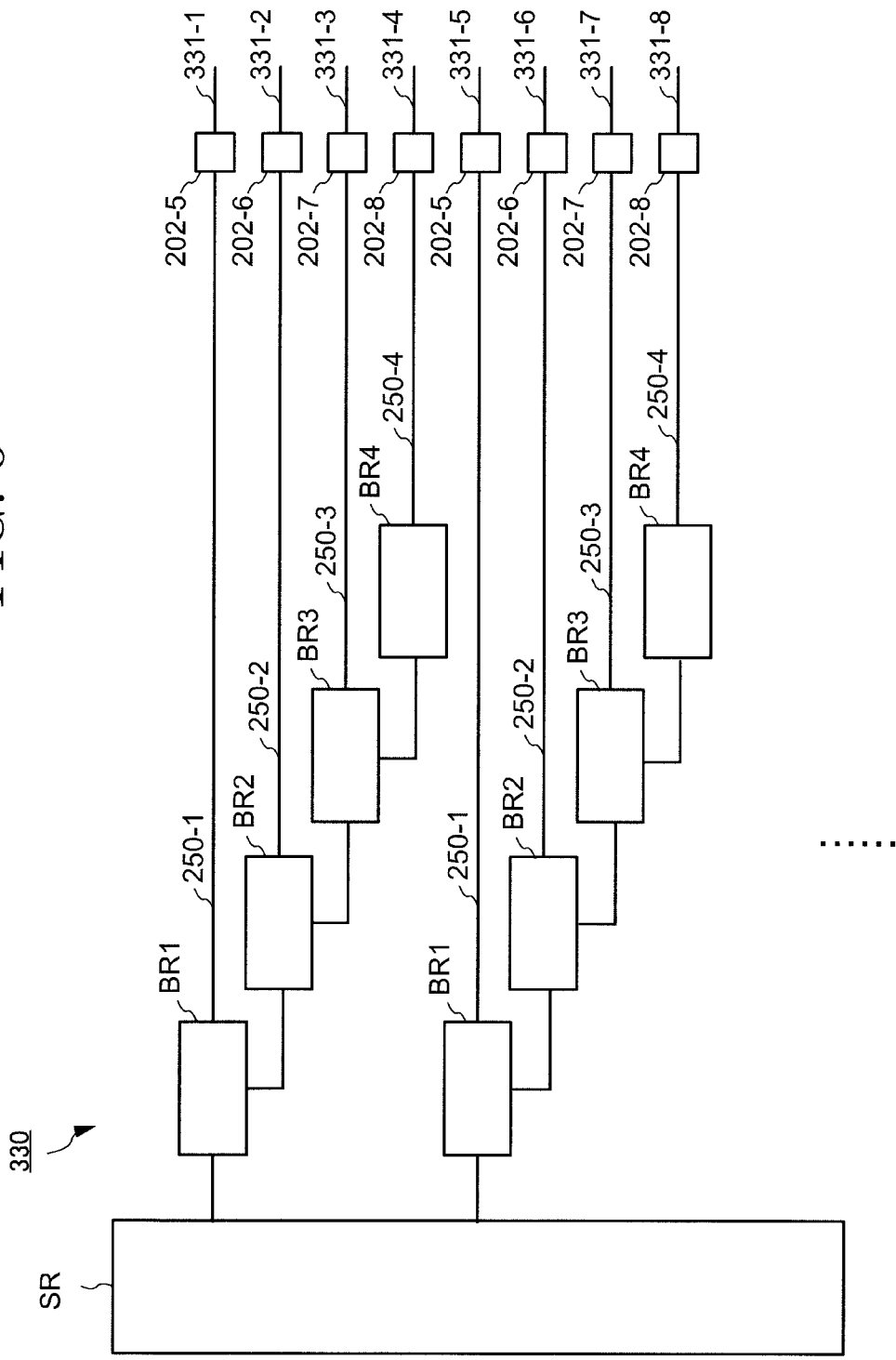
FIG. 6 is a block diagram illustrating a gate driver circuit of a display device according to an embodiment of the present invention.

Next, a configuration of the gate driver circuit 330 as an example of the peripheral circuit will be described with reference to FIG. 6 to FIG. 14. FIG. 6 is a block diagram illustrating a configuration of the gate driver circuit 330. In FIG. 6, the gate driver circuit 330 includes a plurality of units constituting at least a shift register SR and a first switch circuit BR1 to a fourth switch circuit BR4. The first switch circuit BR1 to the fourth switch circuit BR4 are respectively connected to gate wirings 331-1 to 331-4 via connecting wirings 250-1 to 250-4 and relay electrodes 202-5 to 202-8.

Each of the gate wirings 331-1 to 331-8 is connected to each of the gate wiring GL2 of the transistor Tr2 of the display area 22.

The switch circuit BR is driven based on a signal output from the shift register SR, and a gate signal GATE containing a pulse wave is supplied from the switch circuit BR to the gate wiring 331 via the relay electrode 202. The gate signal GATE controls the on-state or off-state of each transistor Tr2.

Figure 7:
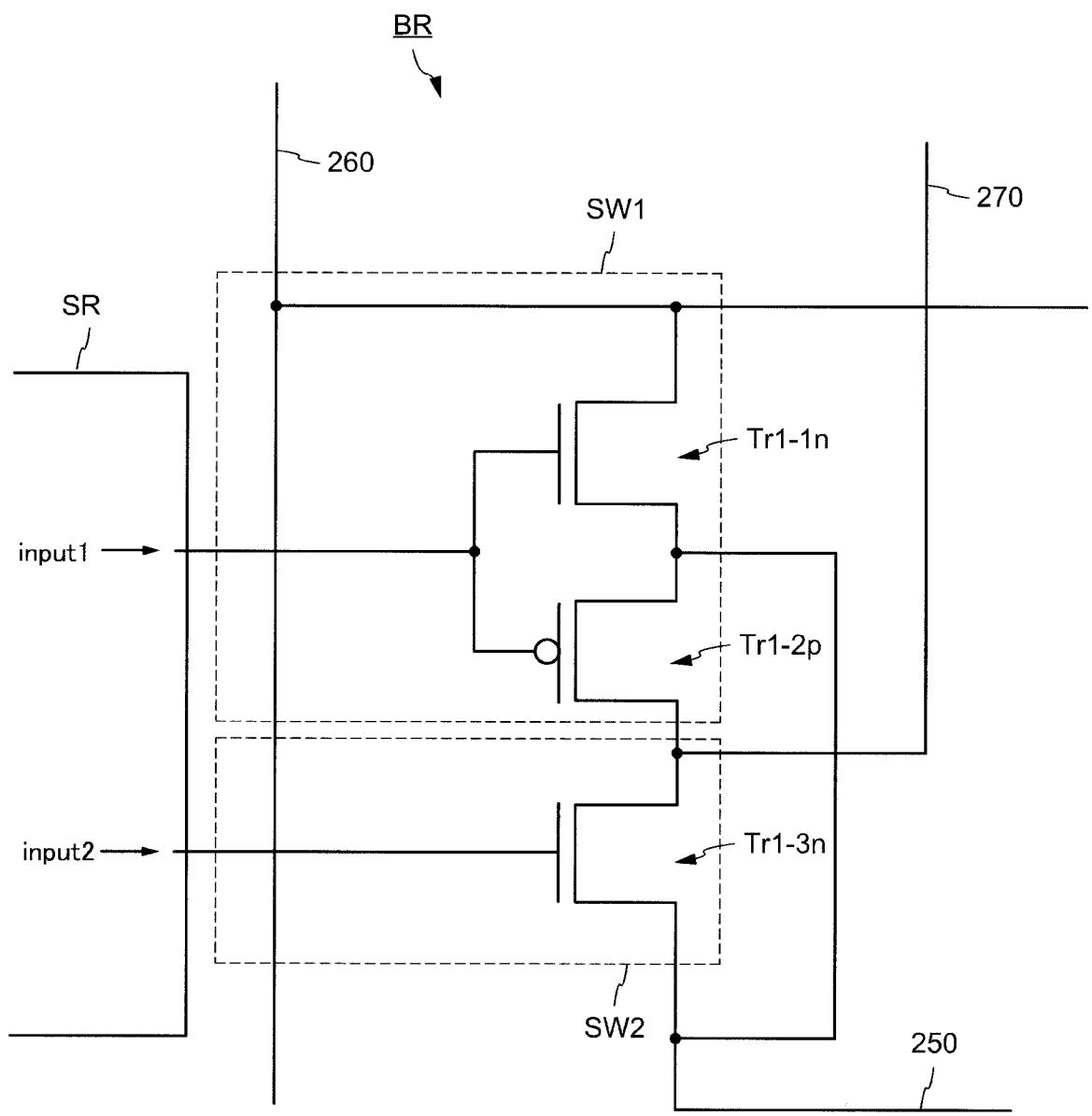
FIG. 7 is an example of a circuit diagram of a switch circuit.

FIG. 7 is an example of a circuit diagram of the switch circuit BR. In the following description, when not distinguishing each of the first switch circuit BR1 to the fourth switch circuit BR4, the switch is described as the switch circuit BR. The same applies to the respective components of the first switch circuit BR1 to the fourth switch circuit BR4.

As shown in FIG. 7, the switch circuit BR includes a first switch part SW1 and a second switch part SW2 for receiving an input from the shift register SR. The inputs to the first switch part SW1 and the second switch part SW2 are complementary to each other. For example, in the case where a high signal as a first input signal input 1 is input to the first switch part SW1, a low signal as a second input signal input 2 is input to the second switch part SW2 at the same time. In the first switch part SW1 and the second switch part SW2, the inputs of the first input signal input 1 and the second input signal input 2 may be interchanged.

The first switch part SW1 includes an n-type first transistor Tr1-1n and a p-type second transistor Tr1-2p to which the first input signal input 1 is input. The second switch part SW2 includes an n-type third transistor Tr1-3n to which the second input signal input 2 is input. In each of the first switch circuit BR1 to the fourth switch circuit BR4, the first switch parts SW1 are connected to each other, and the second switch parts SW2 are connected to each other. The connection relationship of these will be described later.

A high-definition display device in which the number of pixels in the display area 22 is increased by reducing the size of pixels significantly increases the number of pixel rows. Consequently, when simply arranging the switch circuit SW for supplying a potential to the gate wiring of each pixel row in the second direction D2, the length the gate driver circuit in the second direction D2 becomes significantly larger than the length of the display area 22 in the second direction D2. Therefore, in the display device according to an embodiment of the present invention, the four switch circuits BR are arranged in the first direction D1 as one unit, and these units are arranged in the second direction D2. In each unit, each of the first switch circuit BR1 to the fourth switch circuit BR4 is aligned in the first direction D1 while slightly deviating in the second direction D2. In one unit, only the first switch circuit BR1 is directly connected to the shift register SR, and the second switch circuit BR2 receives the output of the shift register SR through the first switch circuit BR1. The third switch circuit BR3 receives the output of the shift register SR through the first switch circuit BR1 and the second switch circuit BR2, and the fourth switch circuit BR4 receives the output of the shift register SR through the first switch circuit BR1, the second switch circuit BR2, and the third switch circuit BR3. By sequentially supplying the output from the shift register SR as described above, the four switch circuits from the first switch circuit BR1 to the fourth switch circuit BR4 in the unit are sequentially driven.

Hereinafter, a layout of the switch circuit BR will be described with reference to FIG. 8 to FIG. 14. Since the configuration of each switch circuit BR is substantially the same, in the following description, the configuration of the first switch circuit BR1 will be mainly described.

In the following description, a configuration numbered 202-*n* indicates that it is the same layer as the gate wiring GL1 in FIG. 4. A configuration numbered 204-*n* indicates that it is the same layer as the semiconductor layer S in FIG. 4. A configuration numbered 206-*n* indicates that it is the contact hole formed in the insulating layer IL1 and the gate insulating layer GI2 in FIG. 4. A configuration numbered 208-*n* indicates that it is the same layer as the gate wiring GL2 and the wiring W1 (or W1 itself) in FIG. 4. A configuration numbered 212-*n* indicates that it is the contact hole formed in the insulating layer IL2 in FIG. 4. A configuration numbered 214-*n* indicates that it is the same layer as the wiring W2 (or W2 itself) in FIG. 4. A configuration numbered 216-*n* indicates that it is the contact hole formed in the insulating layer IL3 in FIG. 4. A configuration numbered 218-*n* indicates that it is the same layer as the connection electrode ZTCO in FIG. 4. A configuration numbered 222-*n* indicates that it is the contact hole formed in the insulating layer IL4 in FIG. 4. The configuration numbered 224-*n* indicates that it is the same layer as the pixel electrode PTCO2 in FIG. 4. A configuration numbered 226-*n* indicates that it is the contact hole formed in the insulating layer IL5 in FIG. 4. A configuration numbered 228-*n* indicates that it is the same layer as the common auxiliary electrode CMTL2 in FIG. 4. A configuration numbered 232-*n* indicates that it is the same layer as the common electrode CTCO2 in FIG. 4.

Figure 8:
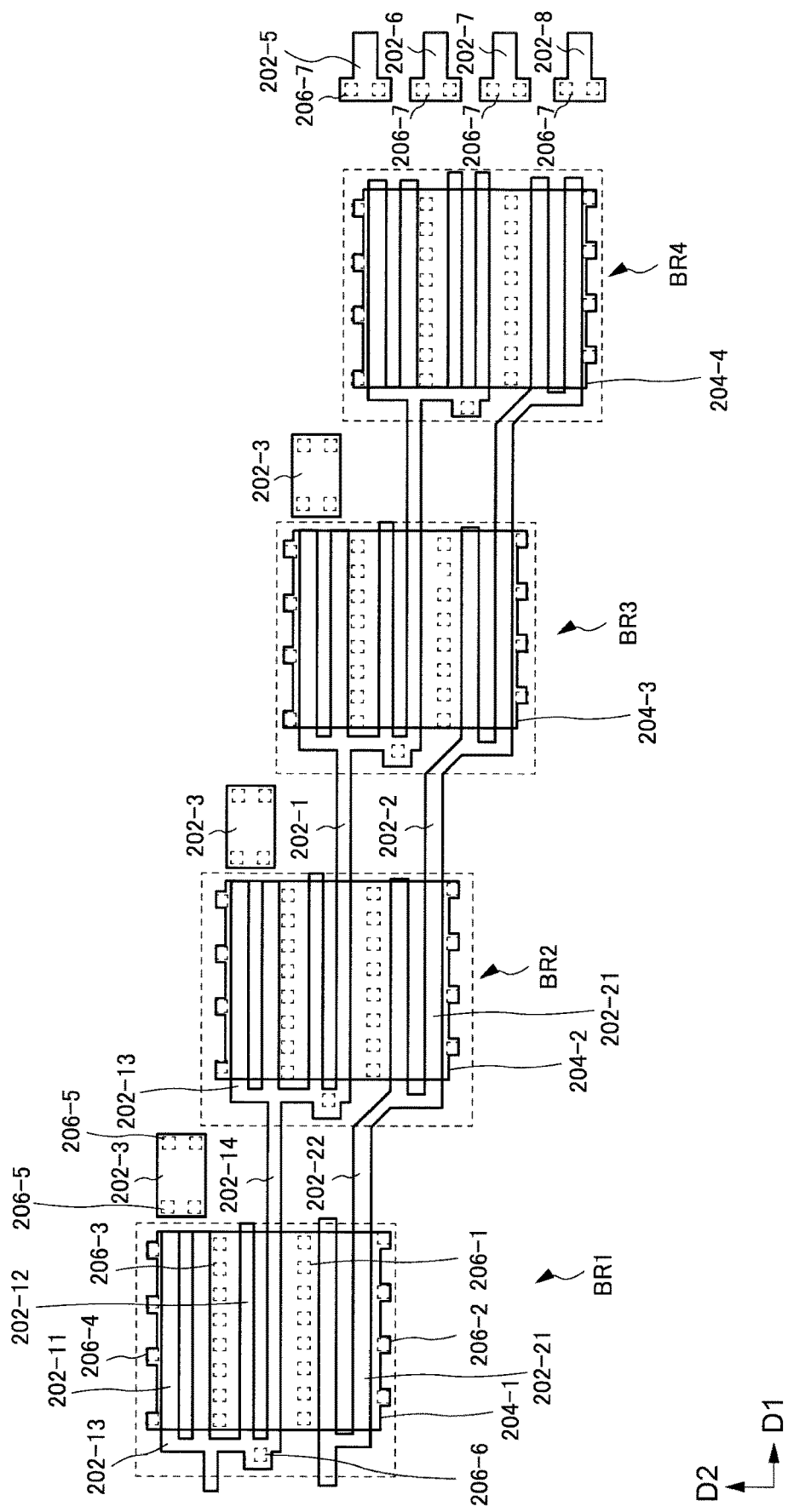
FIG. 8 is an example of a layout of a peripheral circuit of a display device according to an embodiment of the present invention.
Figure 9:
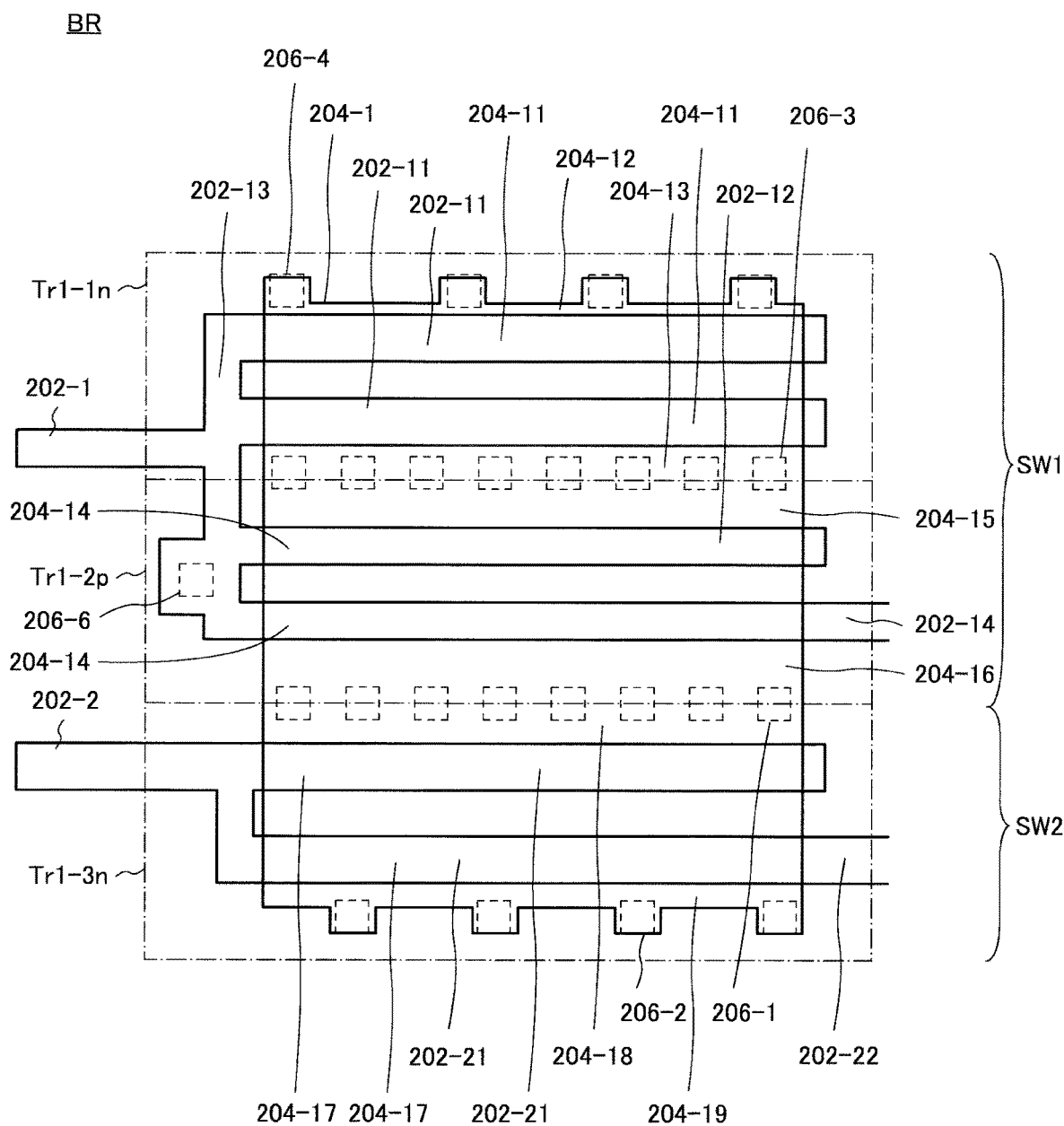
FIG. 9 is a diagram illustrating a layout of a gate electrode and a semiconductor layer in a switch circuit shown in FIG. 8.

As shown in FIG. 8 and FIG. 9, a conductive layer 202-1 functioning as a gate wiring of the first transistor Tr1-1*n* and the second transistor Tr1-2*p*, and a conductive layer 202-2 functioning as a gate wiring of the third transistor Tr1-3*n* are provided on the insulating surface of the substrate SUB. More specifically, the conductive layer 202-1 includes a first gate electrode 202-11 of the first transistor Tr1-1*n*, a second gate electrode 202-12 of the second transistor Tr1-2*p*, and a connection part 202-13 for connecting the first gate electrode 202-11 and the second gate electrode 202-12. Both the first gate electrode 202-11 and the second gate electrode 202-12 have a double-gate structure. In the first switch part SW1, the connection part 202-13 receives the input of the signal output from the shift register SR. The conductive layer 202-1 has a first connecting line 202-14 connected to one of the second gate electrode 202-12 that has a double-gate structure, and the first connecting line 202-14 is connected to the connection part 202-13 of the first transistor Tr1-1*n* of the second switch circuit BR2 (in FIG. 8). The connection relationship is the same and between the second switch circuit BR2 and the third switch circuit BR3, between the third switch circuit BR3 and the fourth switch circuit BR4. As a result, the signal from the shift register SR input to the first switch part SW1 of the first switch circuit BR1 (the connection part 202-13) is sequentially supplied to the first switch part SW1 of the second switch circuit BR2 to the fourth switch circuit BR4.

The conductive layer 202-2 includes a third gate electrode 202-21 of the third transistor Tr1-3*n*. The third gate electrode 202-21 has a double-gate structure. The conductive layer 202-2 has a second connecting line 202-22 connected to one of the third gate electrode 202-21 that has a double-gate structure, and the second connecting line 202-22 is connected to the third gate electrode 202-21 of the third transistor Tr1-3*n* of the second switch circuit BR2. The connection relationship is the same between the second switch circuit BR2 and the third switch circuit BR3, and between the third switch circuit BR3 and the fourth switch circuit BR4. As a result, the signal input to the second switch part SW2 of the first switch circuit BR1 is sequentially supplied to the second switch part SW2 of the second switch circuit BR2 to the fourth switch circuit BR4.

Bridge electrodes 202-3 are provided at positions between the switch circuits BR.

The relay electrodes 202-5 to 202-8 are provided between the fourth switch circuit BR4 and the display area 22. As will be described later, the relay electrode 202-5 is electrically connected to the output of the first switch circuit BR1. The relay electrode 202-6 is electrically connected to the output of the second switch circuit BR2. The relay electrode 202-7 is electrically connected to the output of the third switch circuit BR3. The relay electrode 202-8 is electrically connected to the output of the fourth switch circuit BR4. Although not shown, in the diagram, the relay electrodes 202-5 to 202-8 are connected to each of the gate wiring GL2 extending in the display area 22 along the first direction D1.

As shown in FIG. 8 and FIG. 9, semiconductor layers 204-1 to 204-4 are provided side by side in the first direction D1 in the area overlapping the conductive layers 202-1 and 202-2. Each of the semiconductor layers 204-1 to 204-4 constitute each of the semiconductor layers of the first switch circuit BR1 to the fourth switch circuit BR4. Since the configuration of each semiconductor layer is the same, only the semiconductor layer 204-1 will be described below with reference to FIG. 9.

The semiconductor layer 204-1 includes a first n-type channel part 204-11 facing the first gate electrode 202-11. The semiconductor layer 204-1 includes a first n-type source part 204-12 and a first n-type drain part 204-13 on both sides of the first n-type channel part 204-11, i.e., in the vertical direction in FIG. 9.

The semiconductor layer 204-1 includes a p-type channel part 204-14 facing the second gate electrode 202-12. The semiconductor layer 204-1 includes a p-type drain part 204-15 and a p-type source part 204-16 on both sides of the p-type channel part 204-14, i.e., in the vertical direction in FIG. 9.

The semiconductor layer 204-1 includes a second n-type channel part 204-17 facing the third gate electrode 202-21. The semiconductor layer 204-1 includes a second n-type source part 204-18 and a second n-type drain part 204-19 on both sides of the second n-type channel part 204-17, i.e., in the vertical direction in FIG. 9.

That is, in the semiconductor layer 204-1 of the first switch circuit BR1, from top to bottom in FIG. 9, the first n-type source part 204-12, the first n-type channel part 204-11, the first n-type drain part 204-13, the p-type drain part 204-15, the p-type channel part 204-14, the p-type source part 204-16, the second n-type source part 204-18, the second n-type channel part 204-17, and the second n-type drain part 204-19 are provided side by side in this order.

The first n-type drain part 204-13 and the p-type drain part 204-15 are provided adjacent to each other. The p-type source part 204-16 and the second n-type source part 204-18 are provided adjacent to each other.

Figure 10:
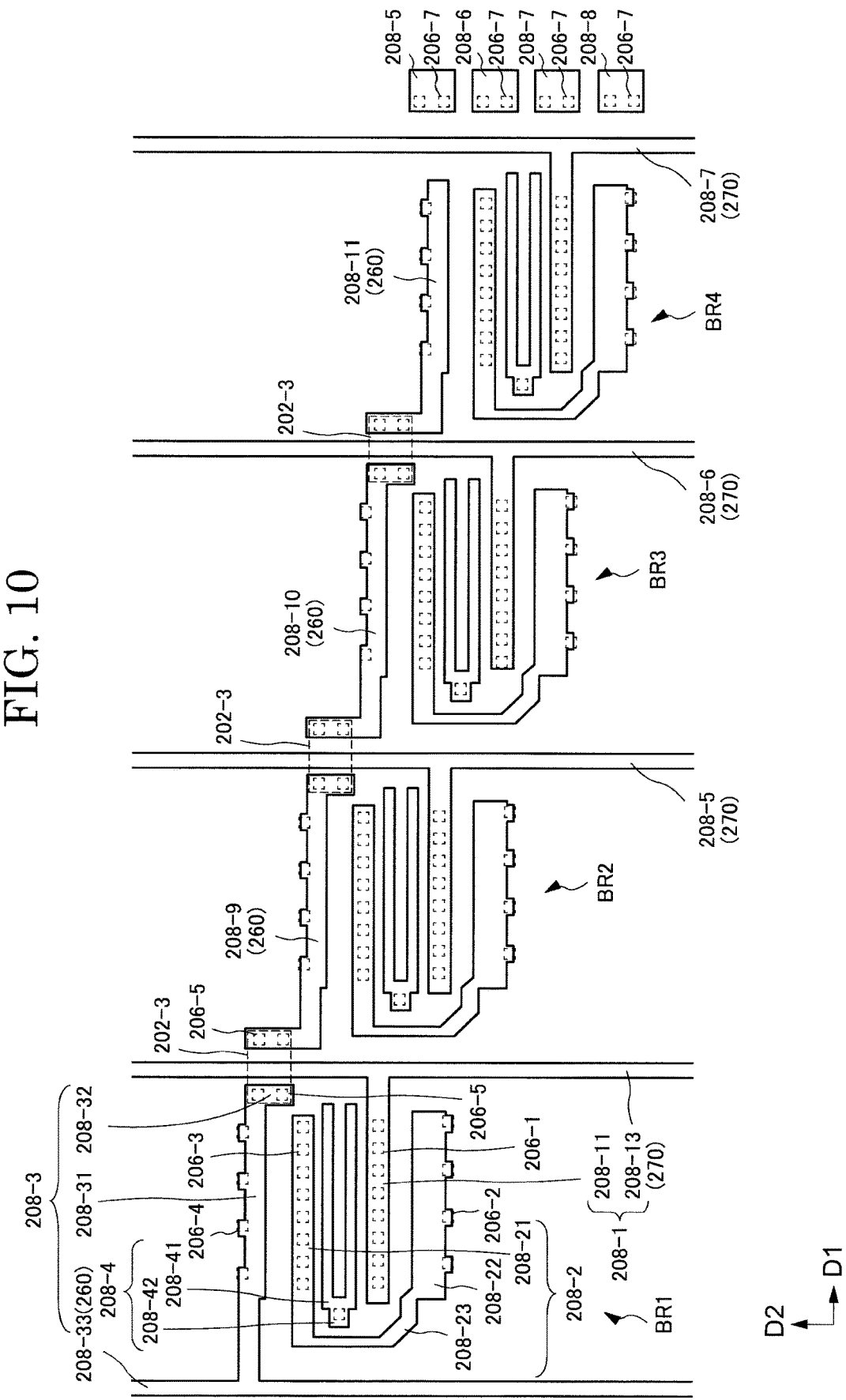
FIG. 10 is an example of a layout of a peripheral circuit of a display device according to an embodiment of the present invention.

As shown in FIG. 4, the insulating layer IL1 and the gate insulating layer GI2 are provided on the semiconductor layers 204-1 to 204-4. As shown in FIG. 8 to FIG. 10, contact holes 206-1 to 206-7 are provided in the insulating layer IL1 and the gate insulating layer GI2 at positions overlapping the semiconductor layer 204-1. More specifically, as shown in FIG. 9, a plurality of contact holes 206-1 is provided along the first direction D1 to expose the p-type source part 204-16 and the second n-type source part 204-

18. A plurality of contact holes 206-2 is provided along the first direction D1 to expose the second n-type drain part 204-19. A plurality of contact holes 206-3 is provided along the first direction D1 to expose the first n-type drain part 204-13 and the p-type drain part 204-15. A plurality of contact holes 206-4 is provided along the first direction D1 to expose the first n-type source part 204-12.

As shown in FIG. 8, a plurality of contact holes 206-5 is provided along the second direction D2 to expose both ends of the bridge electrode 202-3. A plurality of contact holes 206-7 is provided along the second direction D2 to expose the relay electrodes 202-5 to 202-8.

In FIG. 4 and FIG. 10, conductive layers 208-1 to 208-4 functioning as source-electrodes or drain electrodes of the first transistor Tr1-1n, the second transistor Tr1-2p, and the third transistor Tr1-3n are provided on the insulating layer IL1. The conductive layer 208-3 includes a first source electrode part 208-31 extending in the first direction D1 and connected to the first n-type source part 204-12 via the contact hole 206-4, a contact part 208-32 which is connected to the bridge electrode 202-3 via the contact hole 206-5 provided at one end of the first source electrode part 208-31, and a first wiring part 208-33 extending in the second direction D2 provided at the other end of the first source electrode part 208-31. A conductive layer 208-9 having substantially the same shape as the conductive layer 208-3 except for the shape of the left end is provided at a position adjacent to the second switch circuit BR2 and the second direction D2, and the end portion of the conductive layer 208-9 is connected to the bridge electrode 202-3 via the contact hole 206-5. That is, the two adjacent conductive layers (the conductive layer 208-3 and the conductive layer 208-9 in the above description) are connected to each other via the bridge electrode 202-3. As shown in FIG. 10, it is the same in the case between the other adjacent switch circuits BR (the conductive layer 208-9 and a conductive layer 208-10, the conductive layer 208-10 and a conductive layer 208-9). Therefore, the conductive layers 208-3, 208-9 to 208-11 have the same potential, the conductive layer 208 functions as a potential supply line 260 of the first switch circuit BR1, and the conductive layers 208-9 to 208-11 also function as the potential supply line 260 of the respective switch circuits BR2 to BR4.

The conductive layer 208-1 includes a second source electrode part 208-11 extending in the first direction D1. The second source electrode part 208-11 is connected to the p-type source part 204-16 and the second n-type source part 204-18 via the contact hole 206-1. In this case, the conductive layer 208-1 is in batting contact with the p-type source part 204-16 and the second n-type source part 204-18. A batting contact is a structure in which an n-type conductive area and a p-type conductive area having different conductive characteristics from each other are connected via a conductive layer. The present invention is not limited to such a configuration, and a configuration that provides contact holes separately at a position facing the p-type source part 204-16 and a position facing the second n-type source part 204-18, and connects the second source electrode part 208-11 to the p-type source part 204-16 and the second n-type source part 204-18 via the respective contact holes can also be adopted. The conductive layer 208-1 has a second wiring part 208-13 extending in the second direction D2 and is connected to one end of the second source electrode part 208-11. The conductive layers 208-5, 208-6, and 208-7 that are connected to each of the switch circuits BR2 to BR4 has the same configuration as conductive layer 208-1, and function as signal supply lines 270 in each of the switch circuits BR BR2 to BR4.

A conductive layer 208-2 includes a first drain electrode part 208-21, a second drain electrode part 208-22, and a connection part 208-23. The first drain electrode part 208-21 is connected to the first n-type drain part 204-13 and the p-type drain part 204-15 via the contact hole 206-3. The second drain electrode part 208-22 is connected to the second n-type drain part 204-19 via the contact hole 206-2. The connection part 208-23 connects the adjacent first drain electrode part 208-21 and the second drain electrode part 208-22.

The conductive layer 208-4 includes a counter electrode part 208-41 that faces the second gate electrode 202-12 via the semiconductor layer 204-1 (the p-type channel part 204-14) and a contact part 208-42 which is connected to the conductive layer 202-1 via a contact hole 206-6.

First intermediate electrodes 208-5 to 208-8 are provided on the insulating layer IL1 along the second wiring part 208-13 of the fourth switch circuit BR4. The first intermediate electrode 208-5 is connected to the relay electrode 202-5 via the contact hole 206-7. The same applies to the other first intermediate electrodes 208-6 to 208-8. As shown in FIG. 4, in the pixel area, the oxide semiconductor layer OS is provided between the insulating layer IL1 and the gate insulating layer GI2. The gate wiring GL2 is provided facing the oxide semiconductor layer OS. The gate insulating layer GI2 is provided between the oxide semiconductor layer OS and the gate wiring GL2. The conductive layers 208-1 to 208-4, and the first intermediate electrodes 208-5 to 208-8 are formed from the same conductive layer as the gate wiring GL2 of the transistor Tr2. The insulating layer IL2 is provided on the conductive layers 208-1 to 208-4 and the first intermediate electrodes 208-5 to 208-8.

Figure 11:
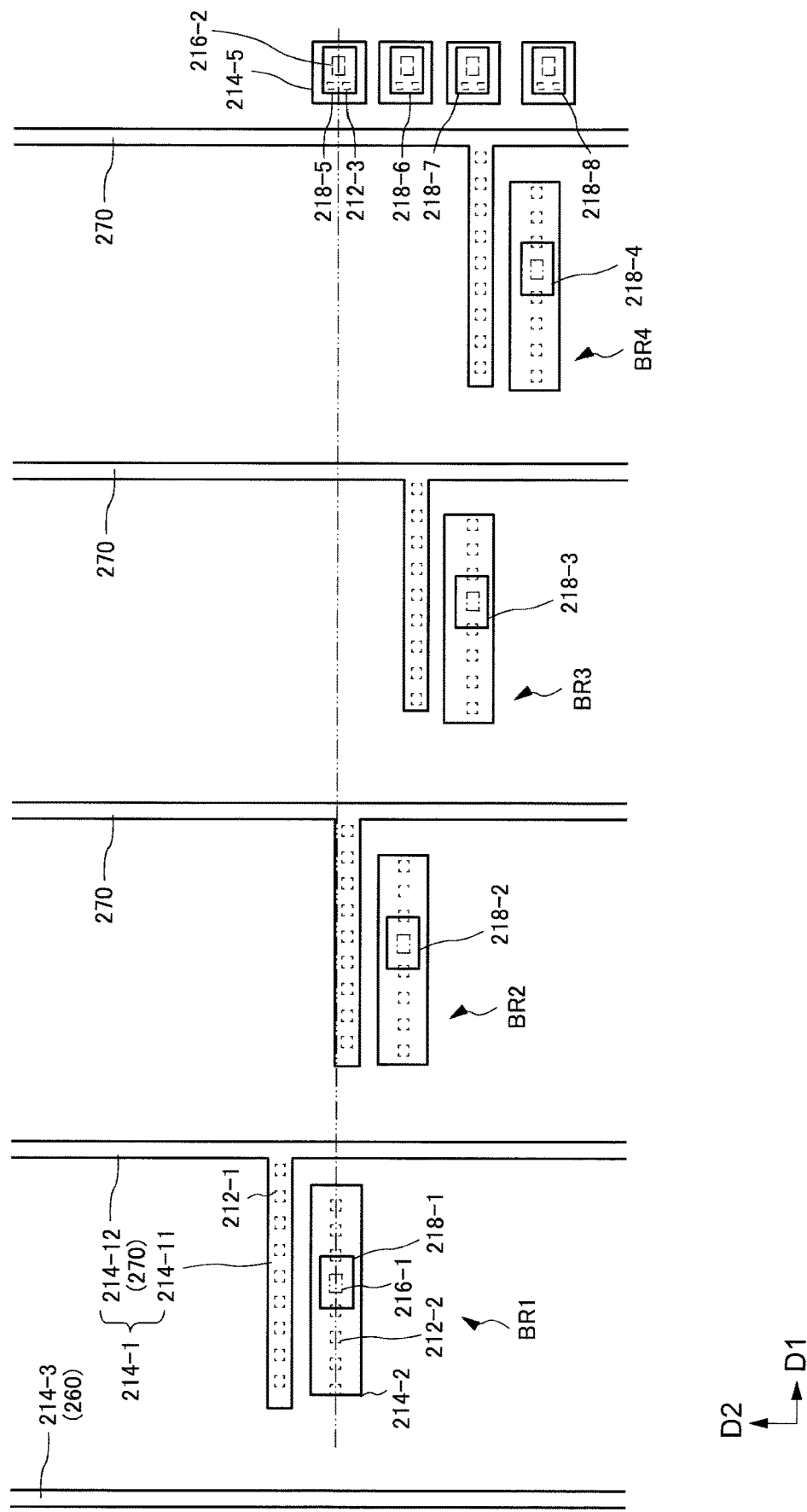
FIG. 11 is an example of a layout of a peripheral circuit of a display device according to an embodiment of the present invention.

In FIG. 11, the insulating layer IL2 is provided with contact holes 212-1 to 212-3. A plurality of contact holes 212-1 is provided along the first direction D1 to expose the second source electrode part 208-11 of the conductive layer 208-1. These contact holes 212-1 are provided between the contact holes 206-1 in a plan view. A plurality of contact holes 212-2 is provided along the first direction D1 to expose the second drain electrode part 208-22 of the conductive layer 208-2. A plurality of contact holes 212-3 is provided along the second direction D2 to expose the first intermediate electrodes 208-5 to 208-8.

A conductive layer 214-1 is provided on the insulating layer IL2. The conductive layer 214-1 includes a long contact part 214-11 that is provided extending in the x direction and connected to the second source electrode part 208-11 of the conductive layer 208-1 via the contact hole 212-1, and a third wiring part 214-12 extending in the second direction D2 and connected to the contact part 214-11. The third wiring part 214-12 overlaps the second wiring part 208-13.

A band-shaped electrode 214-2 (also referred to as an electrode part) that is provided adjacent to the contact part 214-11 of the conductive layer 214-1 in the second direction D2 is provided on the insulating layer IL2. The band-shaped electrode 214-2 is connected to the second drain electrode part 208-22 of the conductive layer 208-2 via the contact hole 212-2.

Figure 12:
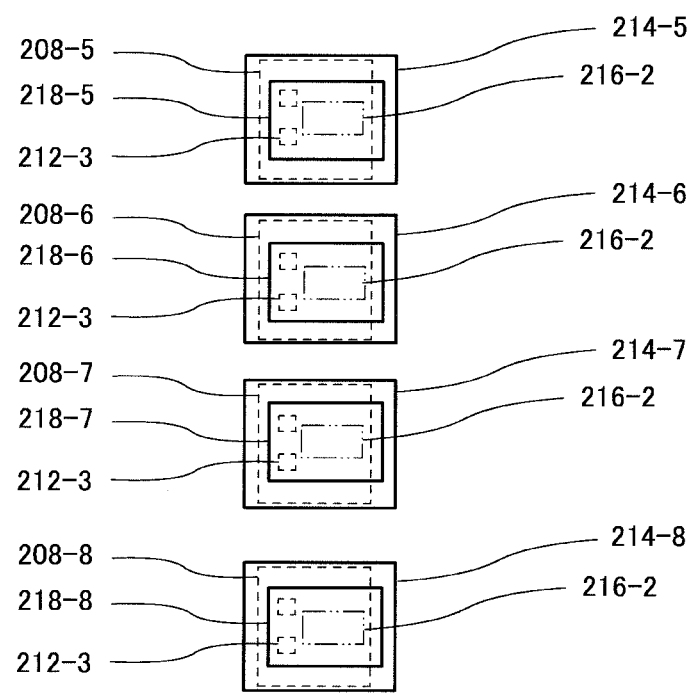
FIG. 12 is a diagram illustrating a layout of a second intermediate electrode and a transparent intermediate electrode shown in FIG. 11.
Figure 12:
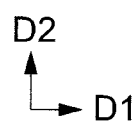

As shown in FIG. 11 and FIG. 12, second intermediate electrodes 214-5 to 214-8 are provided on the insulating layer IL2 at a position facing the first intermediate electrodes 208-5 to 208-8. The second intermediate electrodes 214-5 to 214-8 are connected to the first intermediate electrodes 208-5 to 208-8, respectively, via the contact hole 212-3.

A fourth wiring part 214-3 extending in the second direction D2 and overlapping the first wiring part 208-33 is provided on the insulating layer IL2.

The conductive layer 214-1, the band-shaped electrode 214-2, and the fourth wiring part 214-3 are formed from the same conductive layer as the wiring W2 that functions as one of the source electrode or drain electrode of the transistor Tr2. The insulating layer IL3 is provided on the conductive layer 214-1, the band-shaped electrode 214-2, and the fourth wiring part 214-3.

As shown in FIG. 4, FIG. 11, and FIG. 12, contact holes 216-1 and 216-2 are provided in the insulating layer IL3. The contact hole 216-1 exposes the band-shaped electrode 214-2 of each switch circuit BR. In a plan view, the contact hole 216-1 is arranged to line up with the contact hole 212-2 along the first direction D1, and a width of the first direction D1 is larger than the contact hole 212-2. The contact hole 216-1 is provided between the contact holes 212-2. The contact hole 216-2 exposes the second intermediate electrodes 214-5 to 214-8. A width of the contact hole 216-2 in the first direction D1 (length in the first direction D1) is also larger than the contact hole 212-3 located in the vicinity viewed in a plan view.

Transparent intermediate electrodes 218-1, 218-5 to 218-8 are provided on the insulating layer IL3. The transparent intermediate electrode 218-1 is formed in a rectangular shape and is provided at a position overlapping the band-shaped electrode 214-2 and is connected to the band-shaped electrode 214-2 via the contact hole 216-1. A width of the transparent intermediate electrode 218-1 in the second direction D2 (length in the second direction D2) is smaller than the width of the band-shaped electrode 214-2 in the second direction D2.

The transparent intermediate electrodes 218-5 to 218-8 are formed in a rectangular shape and are provided at positions overlapping the second intermediate electrodes 214-5 to 214-8 and are connected to the second intermediate electrodes 214-5 to 214-8 via the contact hole 216-2. Widths of the transparent intermediate electrodes 218-5 to 218-8 in the first direction D1 and the second direction D2 are smaller than the widths of the second intermediate electrodes 214-5 to 214-8, respectively.

The transparent intermediate electrode 218-1 and the transparent intermediate electrode 218-5 of the first switch circuit BR1 have substantially the same center position coordinate position in the second direction D2. As a result, the transparent intermediate electrode 218-1 overlaps the transparent intermediate electrode 218-5 on a virtual straight line parallel to the first direction D1 (shown by a two-dot chain line in FIG. 11). The same applies to the relationship between the transparent intermediate electrode 218-1 and the transparent intermediate electrodes 218-6 to 218-8 of the other switch circuits BR.

The transparent intermediate electrodes 218-1 and 218-2 are formed from the same transparent conductive layer as the connection electrode ZTCO. The insulating layer IL4 is provided on the transparent intermediate electrodes 218-1 and 218-2.

Figure 13:
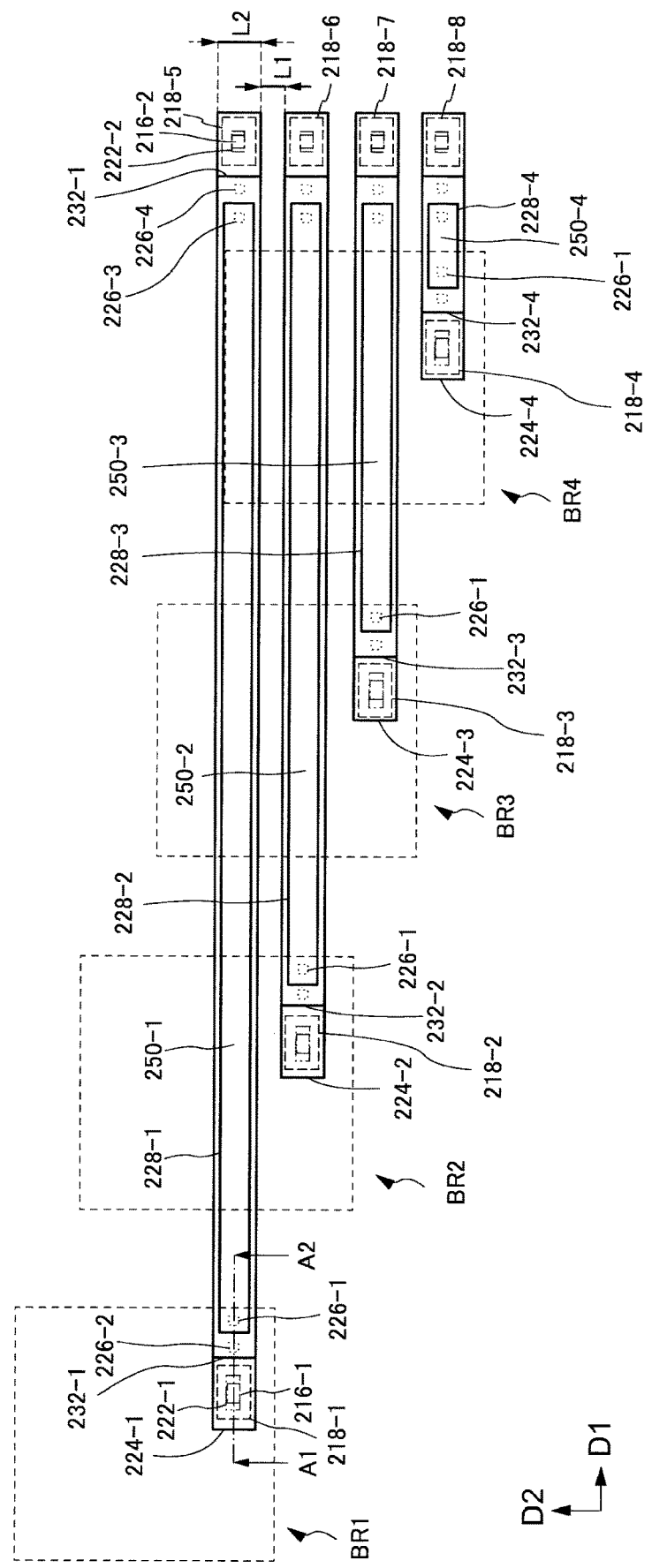
FIG. 13 is an example of a layout of a peripheral circuit of a display device according to an embodiment of the present invention.
Figure 14:
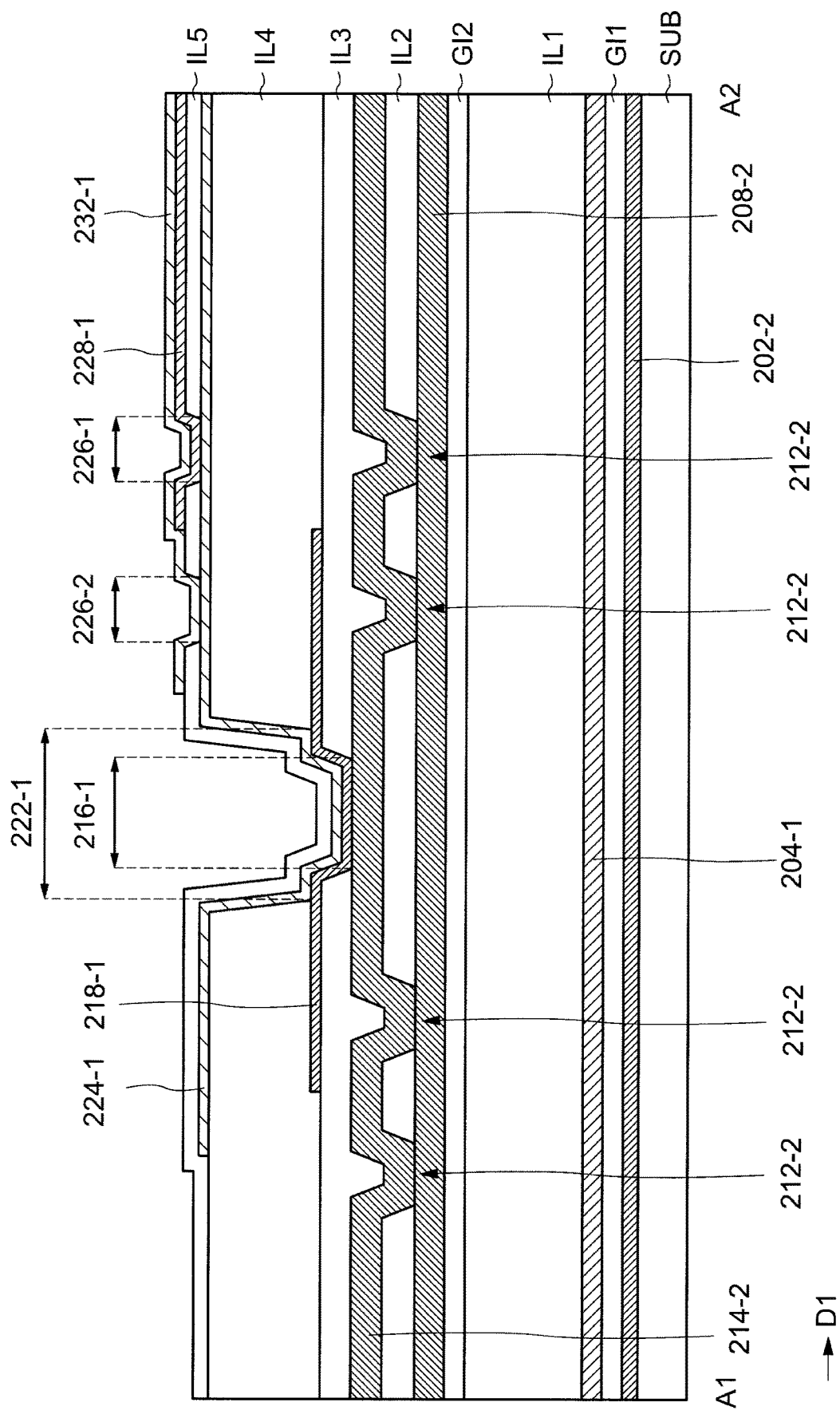
FIG. 14 is a cross-sectional view cut along a line A1-A2 in FIG. 13.

In FIG. 4, FIG. 13, and FIG. 14, contact holes 222-1 and 222-2 are provided in the insulating layer IL4 made of organic insulating material. The contact hole 222-1 is lined up with the contact hole 222-2 along the first direction D1. At least a part of the contact hole 222-1 overlaps the contact hole 216-1 in a plan view and exposes the transparent intermediate electrode 218-1. At least a part of the contact hole 222-2 overlaps the contact hole 216-2 in a plan view and exposes the transparent intermediate electrode 218-5.

The relationship between the transparent intermediate electrodes 218-2 to 218-4 and the contact hole 222-1 and the relationship between the contact hole 222-2 and the transparent intermediate electrodes 218-6 to 218-8 in the other second switch circuit BR2 to the fourth switch circuit BR4 are also the same. FIG. 14 is a cross-sectional view cut along a line A1-A2 shown in FIG. 13.

Band-shaped transparent electrodes 224-1 to 224-4 (also referred to as wiring electrodes) are provided on the insulating layer IL4. The transparent electrode 224-1 is formed to extend in the first direction D1, one end portion overlaps the transparent intermediate electrode 218-1 and the other end portion overlaps the transparent intermediate electrode 218-5. One end portion of the transparent electrode 224-1 is connected to the transparent intermediate electrode 218-1 via the contact hole 222-1. The other end portion of the transparent electrode 224-1 is connected to the transparent intermediate electrode 218-5 via the contact hole 222-2. That is, the transparent intermediate electrode 218-1 and the transparent intermediate electrode 218-5 are electrically connected by the transparent electrode 224-1. Therefore, the first switch circuit BR1 is connected to the relay electrode 202-5. Similarly, the second switch circuit BR2 is connected to the relay electrode 202-6 via the transparent electrode 224-2. The relationship between the third switch circuit BR3, the fourth switch circuit BR4 and the relay electrodes 202-7, 202-8 is also the same. The transparent electrodes 224-1 to 224-4 are formed from the same conductive layer as the pixel electrode PTCO2.

As shown in FIG. 4, the insulating layer IL5 is provided on the transparent electrode 224-1. The insulating layer IL5 is provided with a contact hole 226-1 at a position facing the transparent electrode 224-1. Similarly, the contact hole 226-1 is provided at a position facing each of the transparent electrodes 224-2 to 224-4. The contact hole 226-1 is lined up with the contact holes 222-2 to 226-4 along the first direction D1.

Auxiliary electrodes 228-1 to 228-4 (also referred to as metal wirings) are provided on the insulating layer IL5. The auxiliary electrode 228-1 extends in the first direction D1 and is provided to overlap the transparent electrode 224-1, one end portion is connected to the transparent electrode 224-1 via the contact hole 226-1, and the other end portion is also connected to the transparent electrode 224-1 via the contact hole 226-3. A conductive layer such as a transparent electrode having light transmittance tends to have high resistance. Therefore, wiring resistance can be reduced by connecting the transparent electrode 224-1 and the metal auxiliary electrode 228-1 having low resistance.

A band-shaped protective electrode 232-1 is further provided on the auxiliary electrode 228-1. The protective electrode 232-1 is slightly larger than the auxiliary electrode 228-1, has substantially the same width as the transparent electrode 224-1 and extends in the first direction D1. The protective electrode 232-1 has a length in the first direction D1 slightly longer than the auxiliary electrode 228-1, and both ends are connected to the transparent electrode 224-1 via the contact hole 226-2 and the contact hole 226-4. An intermediate portion between both ends of the protective electrode 232-1 is in direct contact with the auxiliary electrode 228-1. Similarly, protective electrodes 232-2 to 232-4 are provided on the auxiliary electrodes 228-2 to 228-4.

Each of the transparent electrode 224-1, the auxiliary electrode 228-1, and the protective electrode 232-1 is provided overlapping each other and extends along the first direction D1 and is connected via the contact holes 226-1 to 226-4, and functions as the single connecting wiring 250-1

(also referred to as a first connecting wiring). The connecting wiring 250-1 is provided to intersect the second switch circuit BR2, the third switch circuit BR3, and the fourth switch circuit BR4 in the first direction D1 in a plan view. One end of the connecting wiring 250-1 is electrically connected to the band-shaped electrode 214-2 forming the output part of the first switch circuit BR1 through the transparent intermediate electrode 218-1, and the other end of the connecting wiring 250-1 is electrically connected to the relay electrode 202-5 via the transparent intermediate electrode 218-5, the second intermediate electrode 214-5, and the first intermediate electrode 208-5.

As shown in FIG. 13, the connecting wiring 250-2 (also referred to as a second connecting wiring) having the same structure as that of the connecting wiring 250-1 is provided at a position adjacent to the connecting wiring 250-1 in the second direction D2. The connecting wiring 250-2 is provided to intersect the third switch circuit BR3 and the fourth switch circuit BR4 in the first direction D1 in a plan view, one end portion is connected to the band-shaped electrode 214-2 that is an output part of the second switch circuit BR2, and the other end portion is connected to the relay electrode 202-6.

Similarly, a connecting wiring 250-3 having the same structure as the connecting wiring 250-1 is provided at a position adjacent to the connecting wiring 250-2 in the second direction D2. The connecting wiring 250-3 is provided to intersect the first direction D1 in the fourth switch circuit BR4 in a plan view, one end portion is connected to the band-shaped electrode 214-2 that is the output part of the third switch circuit BR3, and the other end portion is connected to the relay electrode 202-7.

Similarly, the connecting wiring 250-4 having the same structure as that of the connecting wiring 250-1 is provided at a position adjacent to the connecting wiring 250-3 in the second direction D2. The connecting wiring 250-4 extends in the first direction D1, one end portion is connected to the band-shaped electrode 214-2 that is the output part of the fourth switch circuit BR4, and the other end portion is connected to the relay electrode 202-8.

A spacing between the adjacent connecting wirings L1 is smaller than the width of the connecting wiring, i.e., the length L2 (or width) of the transparent electrodes 224-1 and 224-2 in the second direction D2.

In the above configuration, although the connecting wiring 250 is formed by the transparent electrode 224-1, the auxiliary electrode 228-1, and the protective electrode 232-1, a configuration without using any one or two electrodes can also be adopted.

The first wiring part 208-33 and the second wiring part 208-13 described above, and the fourth wiring part 214-3 and the third wiring part 214-12 overlapping them function as potential supply lines. More specifically, the fourth wiring part 214-3 overlapping the first wiring part 208-33 and the fourth wiring part 208-33 functions as one potential supply line 260 by contacting each other at one or more locations in the wiring path. The potential supply line 260 is supplied with a fixed potential for fixing the pixel transistor of the pixel circuit 350 to off. The potential supply line 260 extends in the first direction D1 via the conductive layer 208-3 and the bridge electrode 202-3 as shown in FIG. 10, thereby the fixed potential is supplied to the second switch circuit BR2 to the fourth switch circuit BR4.

The third wiring part 214-12 overlapping the second wiring part 208-13 and the third wiring part 208-13 functions as one signal supply line 270 by contacting each other at one or more locations in the wiring path. A pulse wave for turning on the pixel transistor is supplied to the signal supply line 270 at a predetermined period. The signal supply line 270 is provided for each switch circuit BR, and the order in which the pulse wave is supplied to each switch circuit BR is; the second switch circuit BR2 after the first switch circuit BR1, the third switch circuit BR3 after the second switch circuit BR2, and the fourth switch circuit BR4 after the third switch circuit BR3.

The above is a configuration around the first switch circuit BR1 to the fourth switch circuit BR4 around the gate driver circuit. The operation that the switch circuit BR receives a signal from the shift register SR and supplies the signal to the relay electrode will be described with reference to FIG. 7. Since the operation of the first switch circuit BR1 to the fourth switch circuit BR4 is substantially the same, the operation in the first switch circuit BR1 will be described.

First, the output signal from the shift register SR is supplied substantially simultaneously to the connection part 202-13 of the first switch part SW1 and the third gate electrode 202-21 of the second switch part SW2. As described above, these input signals are complementary, and here the case where a high signal is input to the third gate electrode 202-21 and a low signal is input to the connection part 202-13 will be described. In this case, the first transistor Tr1-1$n$ is turned off because it is n-type, and the potential from the signal supply line 270 (the first source electrode part 208-31) is not supplied to the first drain electrode part 208-21. On the other hand, the second transistor Tr1-2$p$ is turned on because it is p-type, thereby the signal supply line 270 (the second source electrode part 208-11) and the first drain electrode part 208-21 are connected via the p-type channel part 204-14. The third transistor Tr1-3$n$ is n-type, and since a high signal is input to the third gate electrode 202-21 of the third transistor Tr1-3$n$, the third transistor Tr1-3$n$ is also turned on, thereby the signal supply line 270 (the second source electrode part 208-11) and the second drain electrode part 208-22 are connected via the second n-type channel part 204-17. Therefore, the band-shaped electrode 214-2 that is the output part of the first switch circuit BR1 is supplied with a pulse wave from the signal supply line 270, the pulse wave is supplied to the relay electrode 202-5 via the connecting wiring 250-1, then supplied from the relay electrode 202-5 to the gate wiring GL2 of the display area 22. As a result, the transistor Tr2 in each pixel circuit 350 is turned on, and the pixel signal is rewritten in each pixel circuit 350.

Next, the case where a low signal is input to the third gate electrode 202-21 and a high signal is input to the connection part 202-13 will be described. In this case, the first transistor Tr1-1$n$ is turned on because it is n-type, and the potential from the potential supply line 260 (the first source electrode part 208-31) is supplied to the first drain electrode part 208-21 via the first n-type channel part 204-11. On the other hand, the second transistor Tr1-2$p$ is turned off because it is p-type, thereby the connection between the signal supply line (the second source electrode part 208-11) and the first drain electrode part 208-21 is turned off. The third transistor Tr1-3$n$ is n-type, and since a low signal is input to the third gate electrode 202-21 of the third transistor Tr1-3$n$, the third transistor Tr1-3$n$ is also turned off, thereby the connection between the signal supply line (the second source electrode part 208-11) and the second drain electrode part 208-22 is turned off. Since the first drain electrode part 208-21 and the second drain electrode part 208-22 are connected via the connection part 208-23, the band-shaped electrode 214-2 that is the output part of the first switch circuit BR1 is supplied with a fixed potential from the potential supply line 260 (the first source electrode unit 208-31). Then, the fixed potential is supplied to the relay electrode 202-5 via the connecting wiring 250-1, then supplied from the relay electrode 202-5 to the gate line of the display area 22, and the pixel transistor Tr2 is fixed to the off-state.

In this way, by controlling the on or off state of transistor of the switch circuit BR according to the output from the shift register SR, the potential (signal) from the potential supply line 260 and the signal supply line 270 is supplied to the gate wiring alternately. This forms the gate signal GATE.

The supply of the output signal from the shift register SR for driving the switch circuit BR and the supply of the pulse wave of the signal supply line 270 are synchronized, and therefore, one output from the shift register SR supplies the pulse wave to the gate wiring GL of the display area 22 in the order from the switch circuit BR1 to the fourth switch circuit BR4 among the four switches. In the above description, although the fixed potential is supplied from the potential supply line 260 and the pulse wave is supplied at a predetermined timing from the signal supply line 270, a configuration for interchanging them can also be used by changing the timing of the supply of the pulse wave.

In a display device such as head-mounted displays, high-definition displays with an increased number of pixels are desired. When the number of pixels increases (high definition), the number of wirings of the peripheral circuits (gate driver circuit and source driver circuit) for driving the pixels increases. For example, in the case where the gate wiring and the source wiring of the transistor in the gate driver circuit are used to connect the output of the switch circuit BR of the gate driver circuit and the gate wiring GL1 of the pixel circuit 350, it is necessary to route the gate wiring and the source wiring in the gate driver circuit. Therefore, the occupied area of the peripheral circuit in the substrate increases, and it becomes difficult to narrow the frame of the display device.

In the display device 10 according to an embodiment of the present invention, in the gate driver circuit 330, each switch circuit BR is connected to the relay electrodes 202-5 to 202-8 via each connecting wiring 250-1 to 250-4 including the transparent conductive layer PTCO1 formed by patterning the same conductive layer as the pixel electrode PTCO2 used in the pixel circuit 350, and the outputs from each switch circuit BR are supplied to the relay electrodes 202-5 to 202-8. In this case, for example, the second switch circuit BR2 to the fourth switch circuit BR4 are present between the first switch circuit BR1 and the relay electrode 202-5, by connecting the first switch circuit BR1 and the relay electrode 202-5 via the connecting wiring 250-1 passing over the second switch circuit BR2 to the fourth switch circuit BR4 and several signal supply lines 270, each wiring avoids intersecting each other on the same plane, and the output part and the first relay part of the first switch circuit BR1 are arranged on the same straight line parallel to the first direction D1.

Generally, the size of the non-respective pixels area in second direction D2 in the display area corresponding to the high definition is smaller than the total length of the switch circuits BR arranged in the second direction D2 in side-by-side manner. Therefore, in a configuration where the switch circuits BR are arranged simply adjacent to each other in the second direction D2, it is difficult to arrange each of the switch circuit BR for the gate wiring on the extension line of each gate wiring 331. On the other hand, by adopting the configuration of the present embodiment, although the size of the pixel area in the second direction D2 is smaller than the total length of the switch circuits BR in the second direction D2, the gate wiring 331 and the switch circuit BR for the gate wiring are arranged side by side along the first direction D1. This reduces the length of the wiring. Therefore, the gate driver circuit 330 area in a plan view is reduced because the switch circuit BR and the connecting wiring 250 are arranged overlapping in a plan view, and narrowing the frame of the display device is achieved. Since the length of the wiring to be routed can be shortened, resistance of the wiring can be reduced. A plurality of insulating layers including the insulating layer made of an organic insulating material is interposed between the connecting wiring 250 and each switch circuit BR below the connecting wiring 250, the interval is sufficiently wide. Therefore, the capacitance between these connecting wiring 250 and the switch circuit BR is also suppressed as much as possible. Thus, the delay of the gate signal output from the switch circuit BR is also suppressed.

[9. Configuration of Terminal Part]

Figure 15:
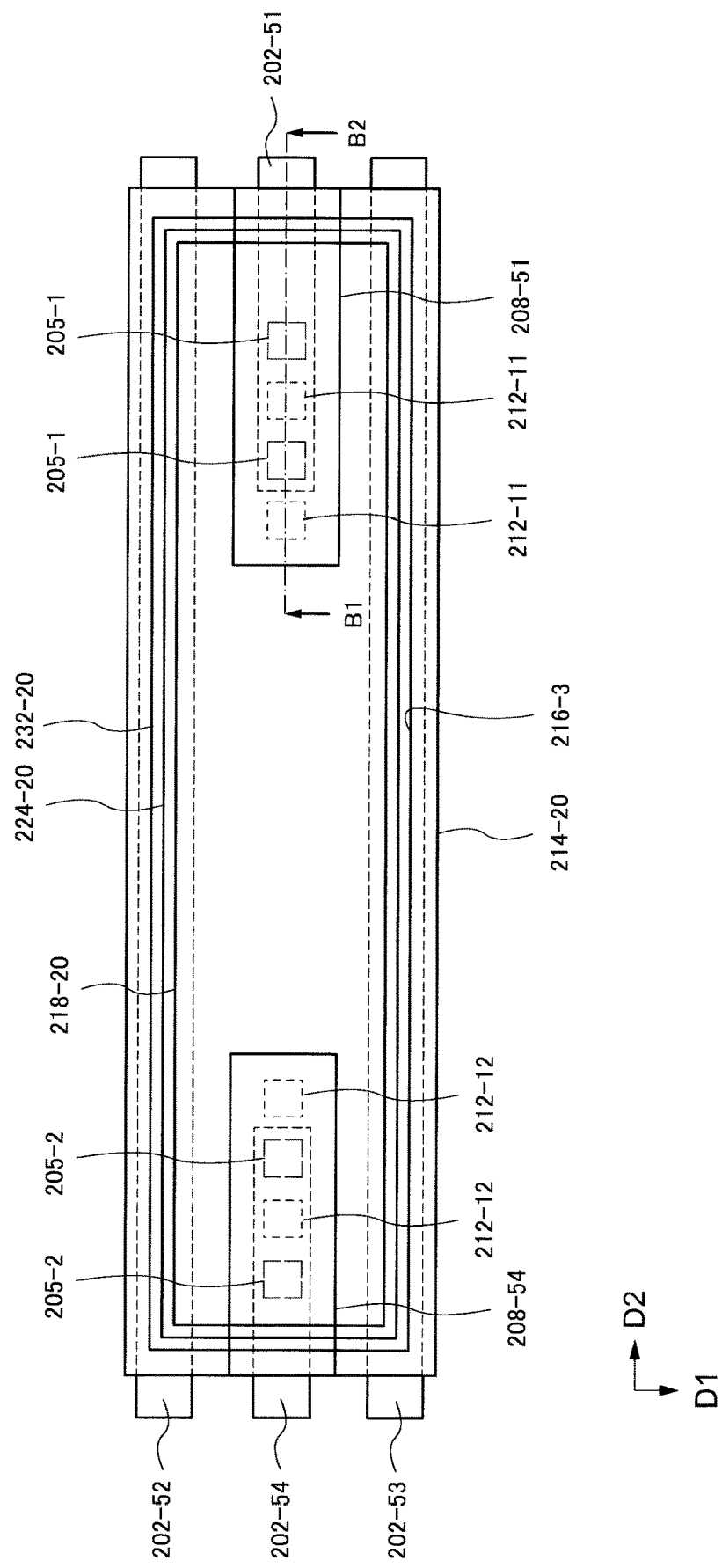
FIG. 15 is an example of a terminal part of a display device according to an embodiment of the present invention.
Figure 16:
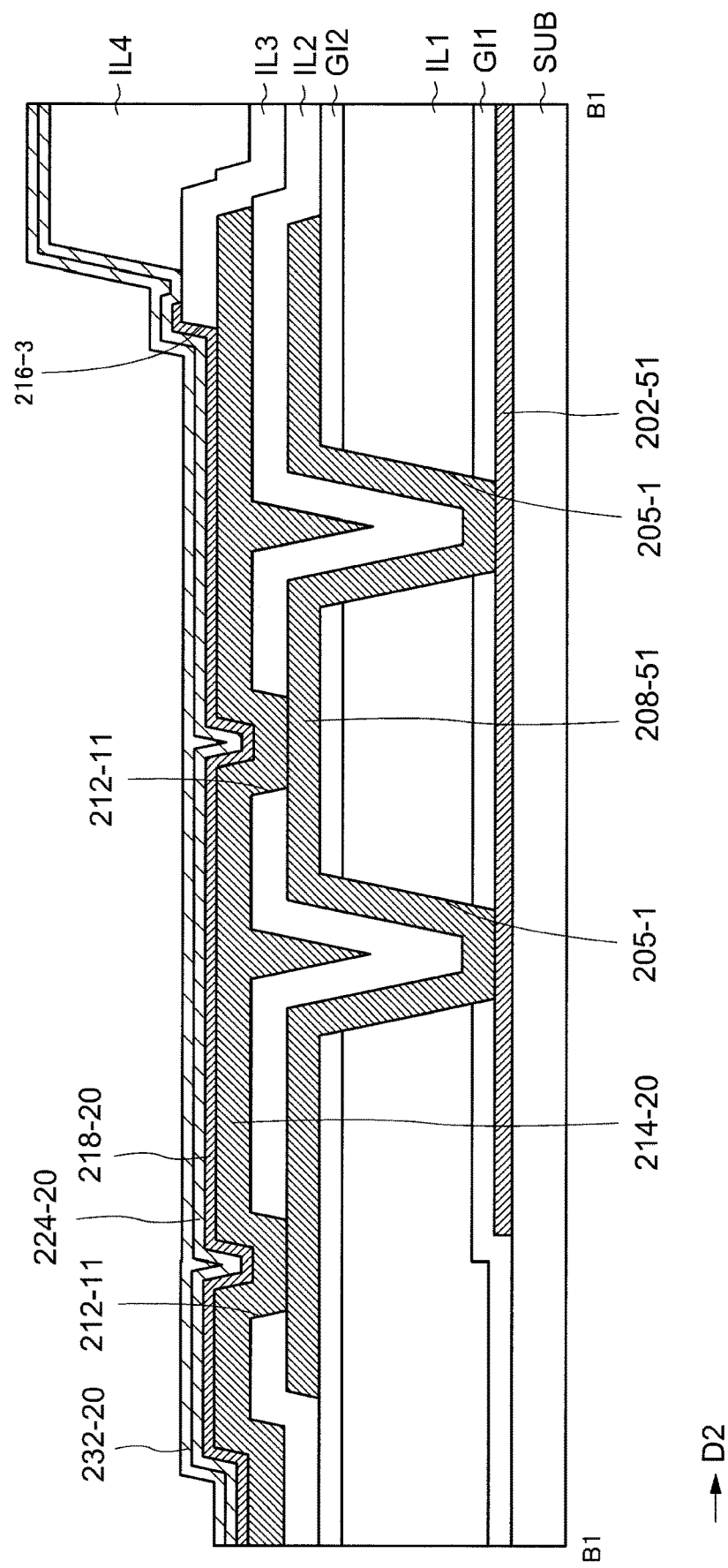
FIG. 16 is a cross-sectional view cut along a line B1-B2 in FIG. 15.

Next, the configuration of the terminal part 333 will be described with reference to FIG. 15 and FIG. 16. FIG. 15 is a layout of the terminal part 333 in a plan view. FIG. 16 is a cross-sectional view cut along a line B1-B2 in FIG. 15.

In a plan view, wirings 202-51 to 202-54 extend along the second direction D2. The wiring 202-52 is provided adjacent to the wiring 202-51 in the first direction D1. The wiring 202-52 is provided adjacent to the wiring 202-54 in the first direction D1. The wiring 202-53 is provided adjacent to the wiring 202-51 and the wiring 202-54 in the first direction D1. The wirings 202-51 to 202-54 are the same layer as the first gate electrode 202-11 of the switch circuit BR.

The gate insulating layer GI1, the insulating layer IL1, and the gate insulating layer GI2 are provided on the wirings 202-51 to 202-54. The gate insulating layer GI1, the insulating layer IL1, and the gate insulating layer GI2 are provided with a plurality of contact holes 205-1 at a position overlapping the wiring 202-51, and with a plurality of contact holes 205-2 at a position overlapping the wiring 202-54.

An island-shaped electrode 208-51 is provided on the gate insulating layer GI2 at a position overlapping the wiring 202-51, and an island-shaped electrode 208-54 is provided at a position overlapping the wiring 202-54. The island-shaped electrode 208-51 is connected to the wiring 202-51 via the contact holes 205-1. The island-shaped electrode 208-54 is also connected to the wiring 202-54 via the contact hole 205-2.

The insulating layer IL2 is provided on the island-shaped electrodes 208-51 and 208-52. The insulating layer IL2 is provided with contact holes 212-11 and 212-12 at positions overlapping the island-shaped electrodes 208-51 and 208-54, respectively. In a plan view, the contact holes 212-11 and 205-1 are alternately arranged in the second direction D2, and the contact holes 212-12 and 205-2 are also alternately arranged in the second direction D2.

A terminal electrode 214-20 is provided on the insulating layer IL2. A terminal electrode 214-10 overlaps the island-shaped electrodes 208-51, 208-54 and is connected to these island-shaped electrodes 208-15 and 208-54 via the contact holes 212-11 and 212-12. The insulating layer IL3 is provided on the terminal electrode 214-20. The insulating layer IL3 is provided with an opening 216-3 for exposing sections other than the peripheral part of the terminal electrode 214-20. The width of the terminal electrode in the first direction D1 is greater than the width of the wiring 202-51 and overlaps the wiring 202-52 and the wiring 202-53 in a plan view.

Three layers of protective electrodes 218-20 covering the exposed terminal electrodes 214-20, 224-20, and 232-20 are stacked and provided on the insulating layer IL3. An area where these protective electrodes 232-20, 224-20, 218-20, and the terminal electrode 214-20 overlap forms the terminal part 333 that is electrically connected to the FPC 600 via anisotropic conductive particles. In FIG. 15, in a plan view, although the area of the protective electrode 232-20 is shown to be larger than the area of the other protective electrode 224-20 and the protective electrode 218-20, the present invention is not limited to this configuration. The area of the protective electrode 232-20 may be the same as the area of the protective electrode 224-20 and the area of the protective electrode 218-20. It is also possible to adopt a configuration in which any two or one of the three protective electrodes 218-20, 224-20, and 232-20 is not provided.

According to such a configuration, since the wiring and the terminal part are formed in separate layers, other wirings not connected to the terminal part (e.g., the wiring 202-52 and the wiring 202-53 in the present embodiment) can be routed below the terminal part, the arrangement density of wiring in the wiring layer is increased. A plurality of insulating layers including an organic insulating layer is provided between the terminal part and other wirings. Therefore, since the interval between the terminal part and the wirings is sufficiently separated in the vertical direction, the capacitance between the terminal parts and the wirings is reduced as much as possible. In addition, other wirings like the wiring 202-52 and the wiring 202-53 are connected other terminals which has the same configuration as the above terminal part 333.

Each of the embodiments described above as an embodiment of the present invention can be appropriately combined and implemented as long as they do not contradict each other. For example, although the configuration of the gate driver circuit 330 has been shown in the above embodiment, it is also possible to adopt such a configuration in the source driver circuit 320. Further, the addition, deletion, or design change of components, or the addition, deletion, or condition change of processes as appropriate by those skilled in the art based on the display device in each embodiment are also included in the scope of the present invention as long as they are provided with the gist of the present invention.

It is understood that, even if the advantageous effect is different from those provided by each of the above-described embodiments, the advantageous effect obvious from the description in the specification or easily predicted by persons ordinarily skilled in the art is apparently derived from the present invention.

What is claimed is:

1. A display device comprising:
a display area;
a frame area surrounding the display area;
a plurality of pixel circuits in the display area;
a peripheral circuit in the frame area; and
wirings connecting the pixel circuits and the peripheral circuit,
wherein
the peripheral circuit includes a plurality of switch circuits along a direction away from the display area, a plurality of relay electrodes between the display area and the plurality of switch circuits, and a plurality of connecting wirings connecting each of the plurality of relay electrodes and each of the plurality of switch circuits, and one of the plurality of connecting wirings connects one of the plurality of switch circuits and one of the plurality of relay electrodes and intersects at least one of the other plurality of switch circuits in a plan view, and
the plurality of switch circuits and the plurality of relay electrodes are covered with an insulating layer, the plurality of connecting wirings is arranged on the insulating layer, and is connected to the plurality of switch circuits and the plurality of relay electrodes via a first contact hole provided in the insulating layer.

2. The display device according to claim 1, wherein
a pixel circuit of the plurality of pixel circuits includes a pixel switch connected to one of the wirings and a pixel electrode connected to the pixel switch,
the pixel electrode is arranged on the insulating layer, and
the plurality of connecting wirings has wiring electrodes arranged on the same layer as the pixel electrode.

3. The display device according to claim 1, wherein
the insulating layer includes an organic insulating film, and at least one or a plurality of inorganic insulating films overlapped on the organic insulating film.

4. The display device according to claim 1, wherein each of the plurality of switch circuits includes a gate electrode, a gate insulating layer covered the gate electrode, a semiconductor arranged on the gate insulating layer, a first insulating film covering the semiconductor layer, a source electrode and a drain electrode arranged on the first insulating film, and is connected to the semiconductor layer via a second contact hole provided in the first insulating film, a second insulating film covering the source electrode and the drain electrode, and an electrode part overlapping the drain electrode via the second insulating film,
wherein
the electrode part is connected to the drain electrode via a third contact hole provided in the second insulating film, thereby constituting the output part of the switch circuit.

5. The display device according to claim 3, wherein
the output part is further covered with the insulating layer, and the plurality of connecting wirings is arranged on the insulating layer and is connected to the output part via a fourth contact hole.

6. The display device according to claim 3, wherein
the gate electrode of each of the plurality switch circuits is connected to each other.

7. The display device according to claim 6, wherein
the peripheral circuit includes a shift register, and
the output of the shift register is supplied to the gate electrode of the switch circuit arranged at a position most apart from the display area in the plurality of switch circuits.

8. The display device according to claim 1, wherein
the plurality of connecting wirings includes a transparent electrode, and a metal wiring is connected to the transparent electrode.

9. The display device according to claim 1, further comprising a plurality of signal supply wirings and a potential supply wiring,
wherein each of the plurality of switch circuits is connected to each of plurality of signal supply wirings, and the potential supply wiring is crossed with at least one of the plurality of signal supply lines in a plan view.

* * * * *